(12) United States Patent
Katsurada et al.

(10) Patent No.: US 12,055,626 B2
(45) Date of Patent: Aug. 6, 2024

(54) VEHICLE LAMP AND VEHICLE

(71) Applicant: KOITO MANUFACTURING CO., LTD., Tokyo (JP)

(72) Inventors: Yoshihiro Katsurada, Shizuoka (JP); Yuichi Watano, Shizuoka (JP); Osamu Kuboyama, Shizuoka (JP); Yuta Maruyama, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 62 days.

(21) Appl. No.: 17/633,476

(22) PCT Filed: Jul. 29, 2020

(86) PCT No.: PCT/JP2020/029139
§ 371 (c)(1),
(2) Date: Feb. 7, 2022

(87) PCT Pub. No.: WO2021/024887
PCT Pub. Date: Feb. 11, 2021

(65) Prior Publication Data
US 2022/0268923 A1 Aug. 25, 2022

(30) Foreign Application Priority Data

Aug. 5, 2019 (JP) .................................. 2019-143656
Aug. 15, 2019 (JP) .................................. 2019-149128
Aug. 15, 2019 (JP) .................................. 2019-149129

(51) Int. Cl.
*G01S 13/931* (2020.01)
*B60Q 1/00* (2006.01)
(Continued)

(52) U.S. Cl.
CPC .......... *G01S 13/931* (2013.01); *B60Q 1/0023* (2013.01); *F21S 41/20* (2018.01); *B60Q 1/04* (2013.01); *G01S 2013/93277* (2020.01)

(58) Field of Classification Search
CPC ......... G01S 13/931; G01S 2013/93277; G01S 7/027; G01S 2013/93271; B60Q 1/0023; B60Q 1/04; F21S 41/20
See application file for complete search history.

(56) References Cited

U.S. PATENT DOCUMENTS 6,380,883 B1 * 4/2002 Bell ...................... G01S 13/931
342/70
6,572,161 B2 * 6/2003 Wild ..................... B60R 19/483
293/136
(Continued)

FOREIGN PATENT DOCUMENTS

JP 2008-186741 A 8/2008
JP 2010-135087 A 6/2010
(Continued)

OTHER PUBLICATIONS

International Search Report issued in International Application No. PCT/JP2020/029139, dated Oct. 13, 2020 (6 pages).
Written Opinion issued in International Application No. PCT/JP2020/029139, dated Oct. 13, 2020 (4 pages).

*Primary Examiner* — Tsion Tumebo
(74) *Attorney, Agent, or Firm* — Osha Bergman Watanabe & Burton LLP

(57) ABSTRACT

A vehicle lamp includes: a lamp housing; a lamp cover; an illumination unit disposed in a lamp chamber; a radar configured to acquire radar data indicating surroundings of a vehicle by emitting an electromagnetic wave outside the vehicle; a concealing part that faces the radar to conceal the radar from the outside of the vehicle and is configured to let the electromagnetic wave emitted from the radar through; a (Continued)

support member that is fixed to a vehicle body and is configured to support and fix the radar; and a positioning part that is disposed between the concealing part and the support member and is configured to position the radar to the concealing part. The concealing part is formed integrally with the lamp cover. The positioning part is fixed to the concealing part and is configured to engage with the support member elastically.

8 Claims, 17 Drawing Sheets

(51) Int. Cl.
*B60Q 1/04* (2006.01)
*F21S 41/20* (2018.01)

(56) References Cited

U.S. PATENT DOCUMENTS

| | | | |
|---|---|---|---|
| 11,465,705 B2* | 10/2022 | Horn | B60Q 1/12 |
| 2005/0115943 A1* | 6/2005 | Winter | B60S 1/0848 |
| | | | 219/202 |
| 2008/0180965 A1 | 7/2008 | Nakamura et al. | |
| 2019/0324119 A1* | 10/2019 | Matori | G01S 7/03 |
| 2020/0300964 A1 | 9/2020 | Kasaba et al. | |
| 2020/0386381 A1* | 12/2020 | Aizawa | F21S 43/50 |
| 2022/0316678 A1* | 10/2022 | Maruyama | B60Q 1/0023 |
| 2023/0062751 A1* | 3/2023 | Katsurada | H01Q 1/3283 |

FOREIGN PATENT DOCUMENTS

| | | |
|---|---|---|
| JP | 2010-137758 A | 6/2010 |
| JP | 2015-076352 A | 4/2015 |
| WO | 2018-051909 A1 | 3/2018 |

* cited by examiner

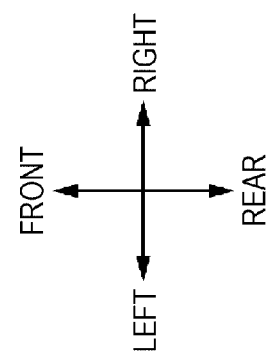
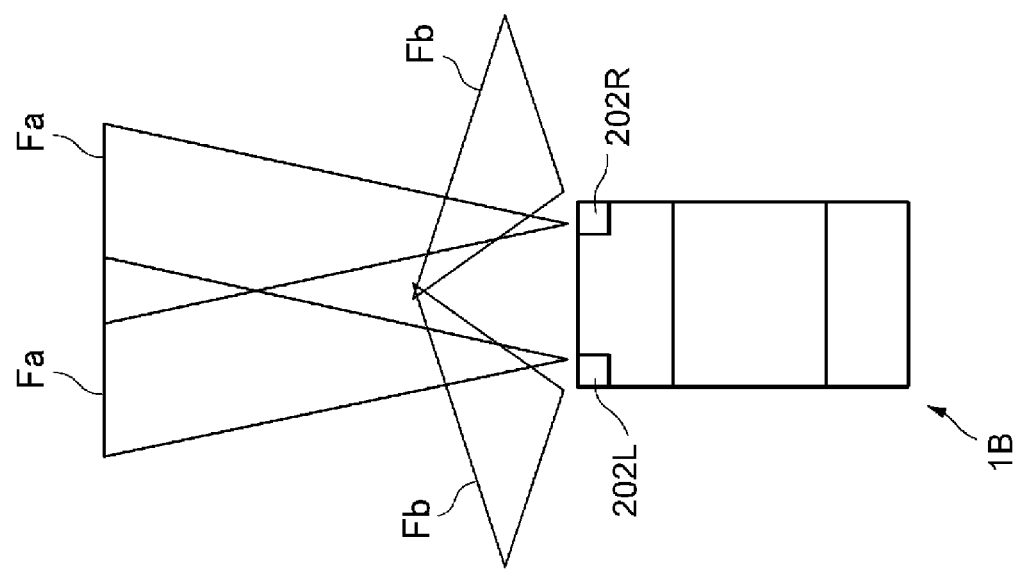
FIG. 15

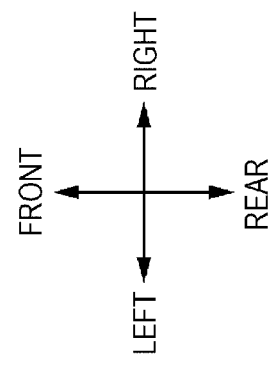
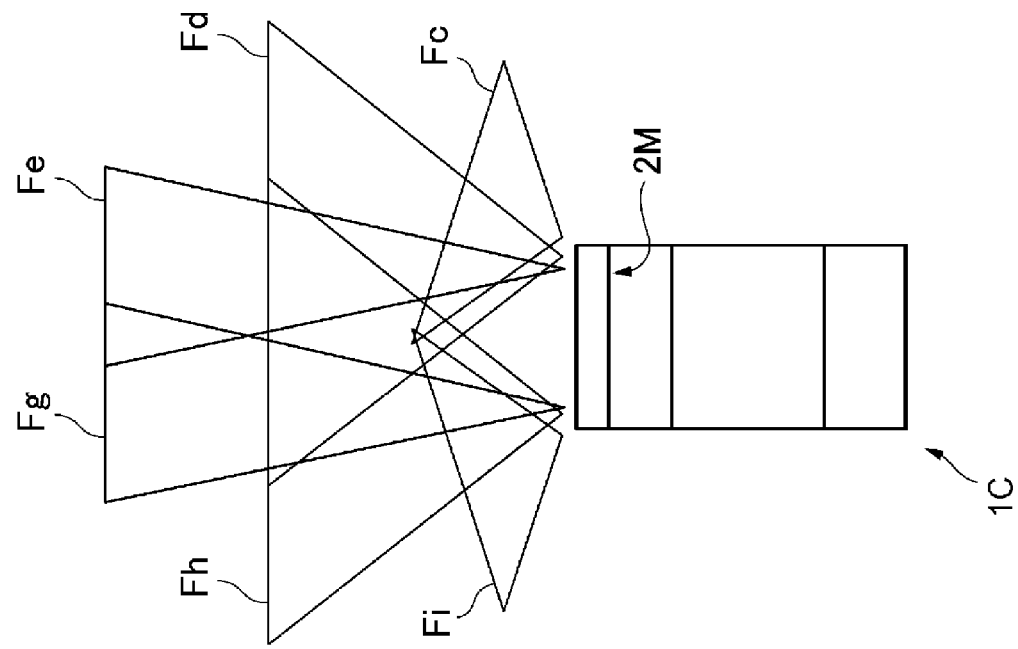
FIG. 17

VEHICLE LAMP AND VEHICLE

TECHNICAL FIELD

The present disclosure relates to a vehicle lamp and a vehicle. In particular, the present disclosure relates to a vehicle lamp and a vehicle on which a radar, such as a millimeter-wave radar or a microwave radar, is mounted.

BACKGROUND ART

There is known a technique for mounting, on a vehicle lamp, a radar, such as a millimeter-wave radar, configured to acquire data indicating surroundings outside a vehicle (for example, see Patent Literature 1). According to Patent Literature 1, a light guide plate made of a resin is disposed in front of a millimeter-wave radar in order to conceal the millimeter-wave radar disposed in a lamp chamber of a vehicle lamp from the outside of the vehicle. In addition, by letting light emitted from a light source into the light guide plate, emission of light from the light guide plate can be visually recognized from the outside of the vehicle. In this way, the millimeter-wave radar can be concealed from the outside of the vehicle by the light emission from the light guide plate, and an electromagnetic wave from the millimeter-wave radar can be radiated away to the outside of the vehicle from the light guide plate.

CITATION LIST

Patent Literature

Patent Literature 1: JP2008-186741A

SUMMARY OF INVENTION

Technical Problem

However, in the vehicle lamp disclosed in Patent Literature 1, since it is necessary to prepare the light guide plate for concealing the millimeter-wave radar separately, the number of components of the vehicle lamp and the number of processes for assembling the vehicle lamp increase. With regard to this point, there is scope for improving a vehicle lamp including a radar, such as a millimeter-wave radar, and a concealing part for concealing the radar.

A first object of the present disclosure is to improve maintainability of a vehicle lamp including a radar and a concealing part configured to conceal the radar from the outside of a vehicle.

A second object of the present disclosure is to provide a vehicle lamp capable of concealing a radar from the outside of a vehicle with reliability of the radar mounted on a vehicle.

A third object of the present disclosure is to provide a vehicle lamp capable of concealing radars mounted on the vehicle lamp from the outside of a vehicle without increasing the number of processes for assembling the vehicle lamp.

Solution to Problem

According to an aspect of the present disclosure, a vehicle lamp includes:
  a lamp housing;
  a lamp cover covering an opening of the lamp housing;
  an illumination unit disposed in a lamp chamber formed by the lamp housing and the lamp cover;
  a radar configured to acquire radar data indicating surroundings of a vehicle by emitting an electromagnetic wave outside the vehicle;
  a concealing part that faces the radar to conceal the radar from the outside of the vehicle and is configured to let the electromagnetic wave emitted from the radar through;
  a support member that is fixed to a vehicle body and is configured to support and fix the radar; and
  a positioning part that is disposed between the concealing part and the support member and is configured to position the radar to the concealing part.

The concealing part is formed integrally with the lamp cover.

The positioning part is fixed to the concealing part and is configured to engage with the support member elastically.

According to the above configuration, the positioning part fixed to the concealing part is configured to engage with the support member elastically. The support member is fixed to the vehicle body. The concealing part is integrally formed with the lamp cover. The concealing part is fixed to the positioning part.

According to the above configuration, since the elastic engagement between the positioning part and the support member can be released using a tool, such as a flathead screwdriver, the positioning part can be separated from the support member more easily than in a case in which the support member and the positioning part are fixed by a screw or the like. Thus, components of the vehicle lamp other than the support member and the radar can be relatively easily detached from the vehicle body with the support member fixed to the vehicle body during maintenance of the vehicle lamp. When the components of the vehicle lamp detached from the vehicle body are attached again to the vehicle body, the concealing part and the radar can be easily positioned with the positioning part engaging with the support member. In this way, it is possible to improve maintainability of the vehicle lamp including the radar and the concealing part.

According to an aspect of the present disclosure, a vehicle lamp mountable on a vehicle includes:
  a lamp housing including a first fixing part and a second fixing part for fixing the vehicle lamp to the vehicle;
  a lamp cover covering an opening of the lamp housing;
  an illumination unit disposed in a lamp chamber formed by the lamp housing and the lamp cover;
  a radar configured to acquire radar data indicating surroundings of the vehicle by emitting an electromagnetic wave outside the vehicle;
  a concealing part that faces the radar to conceal the radar from the outside of the vehicle and is configured to let the electromagnetic wave emitted from the radar through; and
  a support member that is configured to support the radar and is fixed to the lamp housing.

The concealing part is formed integrally with the lamp cover.

The radar is between the first fixing part and the second fixing part in a left-right direction of the vehicle lamp.

According to the above configuration, the radar is between the first fixing part and the second fixing part in the left-right direction of the vehicle lamp. Therefore, even when the lamp housing shakes during traveling of the vehicle, it is possible, by the first fixing part and the second fixing part, to suitably prevent the vibration of the lamp housing from being transferred to the radar. In this way, since operation performance of the radar is suitably prevented from being adversely affected by vibration of the radar, it is possible to provide the vehicle lamp capable of concealing the radar from the outside of the vehicle with reliability of the radar ensured.

According to an aspect of the present disclosure, a vehicle lamp includes:
- a lamp housing;
- a lamp cover covering an opening of the lamp housing;
- an illumination unit disposed in a lamp chamber formed by the lamp housing and the lamp cover;
- a first radar configured to acquire first radar data indicating surroundings of a vehicle by emitting an electromagnetic wave outside the vehicle;
- a second radar configured to acquire second radar data indicating surroundings of the vehicle by emitting an electromagnetic wave outside the vehicle; and
- a concealing part configured to conceal the first radar and the second radar from the outside of the vehicle and to let the electromagnetic waves emitted from the first radar and the second radar through.

The concealing part is formed integrally with the lamp cover.

According to the above configuration, the first radar and the second radar can be concealed from the outside of the vehicle by the concealing part formed integrally with the lamp cover, which obviates a process for attaching the concealing part to the vehicle lamp.

Therefore, it is possible to provide a vehicle lamp capable of concealing radars mounted on the vehicle lamp from the outside of a vehicle without increasing the number of processes for assembling the vehicle lamp.

Advantageous Effects of Invention

According to the present disclosure, it is possible to improve maintainability of a vehicle lamp including a radar and a concealing part configured to conceal the radar from the outside of a vehicle.

According to the present disclosure, it is possible to provide a vehicle lamp capable of concealing a radar from the outside of a vehicle with reliability of the radar mounted on the vehicle lamp ensured.

According to the present disclosure, it is possible to provide a vehicle lamp capable of concealing radars mounted on the vehicle lamp from the outside of a vehicle without increasing the number of processes for assembling the vehicle lamp.

BRIEF DESCRIPTION OF DRAWINGS

FIG. 15 is a schematic view showing fields of view of the first radar mounted on the left vehicle lamp and a second radar mounted on the right vehicle lamp.

FIG. 17 is a schematic view showing fields of view of radars mounted on the vehicle lamp according to the modification.

DESCRIPTION OF EMBODIMENTS

First Embodiment

Figure 1:
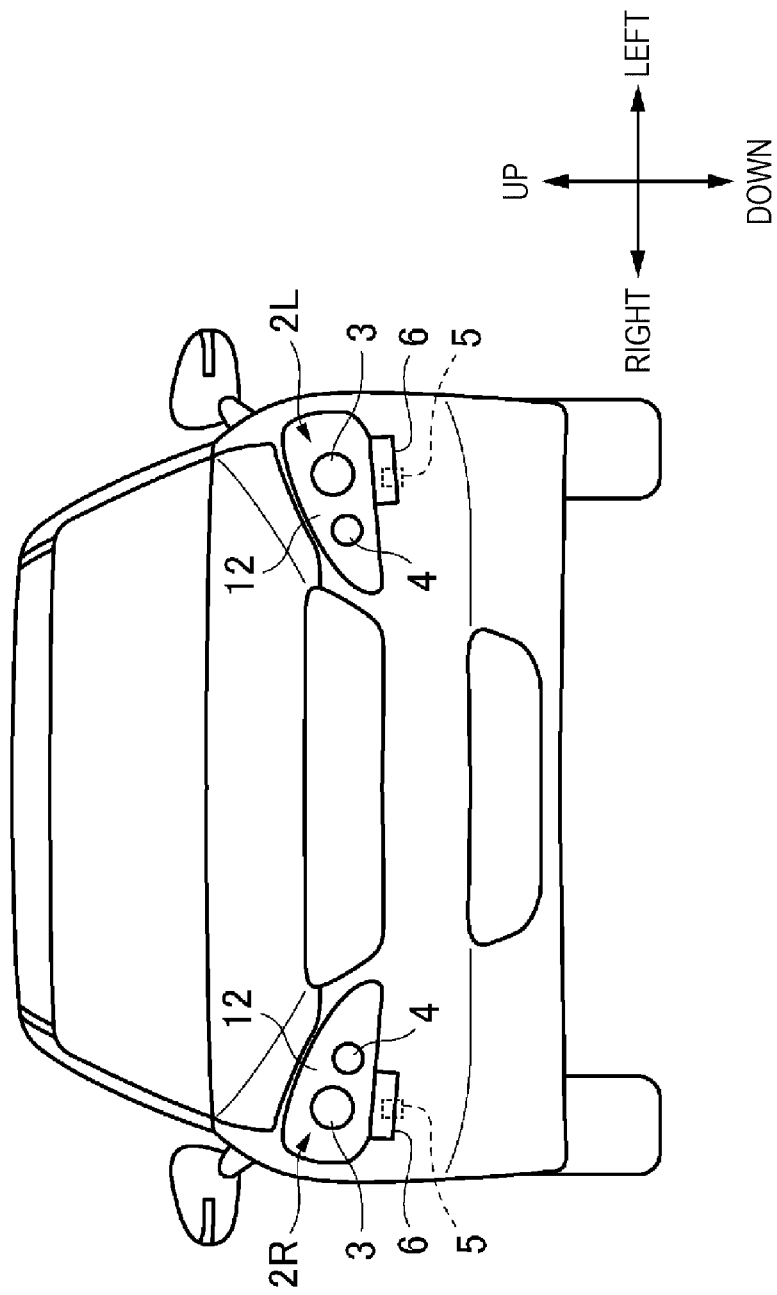
FIG. 1 is a front view of a vehicle including a left vehicle lamp and a right vehicle lamp.

In the following, a first embodiment of the present disclosure (hereinafter, simply referred to as "the present embodiment") will be described with reference to the drawings. Dimensions of components shown in the drawings may be different from actual dimensions of the components for the sake of convenience.

In the description of the present embodiment, a "left-right direction," an "up-down direction," and a "front-rear direction" will be referred to as appropriate for the sake of convenience. These directions are relative directions set for a vehicle 1 shown in FIG. 1.

The "left-right direction" includes a "left direction" and a "right direction." The "up-down direction" includes an "up direction" and a "down direction." The "front-rear direction" includes a "front direction" and a "rear direction." The "front-rear direction" (not shown in FIG. 1) is perpendicular to the left-right direction and the up-down direction.

In the present embodiment, a "horizontal direction" of the vehicle 1 will be referred to which is perpendicular to the up-down direction (vertical direction) and includes the left-right direction and the front-rear direction. Further, in the present embodiment, directions (left-right direction, up-down direction, and front-rear direction) set for a right vehicle lamp 2R and a left vehicle lamp 2L coincide with directions (left-right direction, up-down direction, and front-rear direction) set for the vehicle 1.

First, the vehicle 1 according to the present embodiment will be described with reference to FIG. 1. FIG. 1 is a front view of the vehicle 1 including a left vehicle lamp 2L and a right vehicle lamp 2R. As shown in FIG. 1, the left vehicle lamp 2L is on a front left side of the vehicle 1, and the right vehicle lamp 2R is on a front right side of the vehicle 1. Each of the left vehicle lamp 2L and the right vehicle lamp 2R includes: a low-beam illumination unit 3; a high-beam illumination unit 4; a radar 5; and a concealing part 6 configured to conceal the radar 5.

In the present embodiment, the left vehicle lamp 2L is similar to the right vehicle lamp 2R. Therefore, in the following, the right vehicle lamp 2R will be described with reference to FIG. 2. For the sake of convenience, the left vehicle lamp 2L and the right vehicle lamp 2R will be generically referred to as a "vehicle lamp 2" simply.

The low-beam illumination unit 3 is configured to emit a low-beam light distribution pattern toward the front of the vehicle 1. The high-beam illumination unit 4 is configured to emit a high-beam light distribution pattern toward the front of the vehicle 1.

The radar 5 is configured to acquire radar data indicating surroundings of the vehicle 1 by emitting an electromagnetic wave (for example, a millimeter wave and a microwave) outside the vehicle 1. The radar 5 is, for example, a millimeter-wave radar or a microwave radar. A vehicle control unit (in-vehicle computer, not shown) is configured to catch the surroundings of the vehicle 1 (in particular, information on an object outside the vehicle 1) based on the radar data output from the radar 5.

The radar 5 includes an antenna part and a communication circuit part (not shown). The antenna part includes: one or more transmission antennae configured to emit an electromagnetic wave (for example, a millimeter wave having a wavelength of 1 mm to 10 mm) to the air; and one or more receiving antennae configured to receive a reflected electromagnetic wave reflected by an object. The antenna part may be configured with a patch antenna (a metal pattern formed on a substrate). An emitted electromagnetic wave emitted from the transmission antennae are reflected by an object, such as another vehicle, and then the reflected electromagnetic wave from the object is received by the receiving antennae.

The communication circuit part includes: a transmission radio frequency (RF) circuit; a receiving RF circuit; and a signal processing circuit. The communication circuit part is configured with a monolithic microwave integrated circuit (MMIC). The transmission RF circuit is electrically connected to the transmission antennae. The receiving RF circuit is electrically connected to the receiving antennae. The signal processing circuit is configured to generate radar data by processing a digital signal output from the receiving RF circuit.

The antenna part and the communication circuit part may be accommodated in a case. The antenna part may be covered with a radome.

The concealing part 6 faces the radar 5 to conceal the radar 5 from the outside of the vehicle 1. The concealing part 6 is configured to let an electromagnetic wave emitted from the radar 5 through. The concealing part 6 may be configured with, for example, an opaque resin member. In particular, the concealing part 6 may be configured with a resin member colored in a predetermined color, such as black. The concealing part 6 may be configured with a reflex reflector having a large number of fine prisms. In this case, since light from the outside is totally reflected by the prisms of the reflex reflector, the radar 5 can be concealed from the outside by the reflex reflector. Therefore, the radar 5 can be concealed from the outside of the vehicle 1 by the concealing part 6, thereby improving exterior design of the right vehicle lamp 2R.

Figure 2:
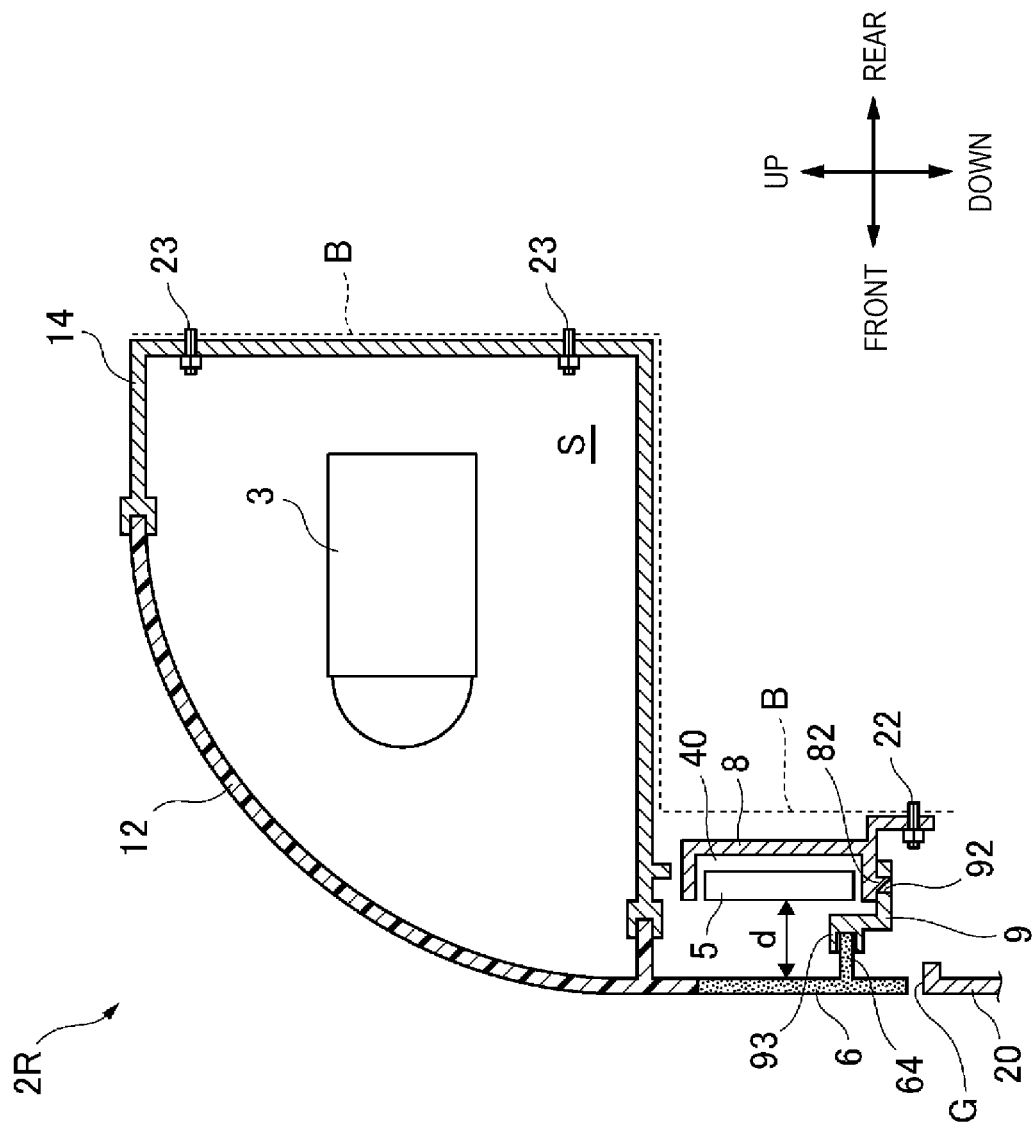
FIG. 2 is a cross sectional view of the right vehicle lamp in a vertical direction.

FIG. 2 is a cross sectional view of the right vehicle lamp 2R in the vertical direction (up-down direction). As shown in FIG. 2, the right vehicle lamp 2R further includes: a lamp housing 14; a lamp cover 12 covering an opening of the lamp housing 14; and a support member 8. The lamp housing 14 may be configured with, for example, a metal member. The lamp cover 12 may be configured with, for example, a transparent resin member. The low-beam illumination unit 3 and the high-beam illumination unit 4 are in a lamp chamber S formed by the lamp housing 14 and the lamp cover 12.

In the present embodiment, instead of the high-beam illumination unit 4, an adaptive driving beam (ADB) illumination unit configured to emit an ADB light distribution pattern having an irradiation region and a non-irradiation region may be disposed in the lamp chamber S. In addition, a LiDAR unit or a camera may be disposed in the lamp chamber S.

Figure 4:
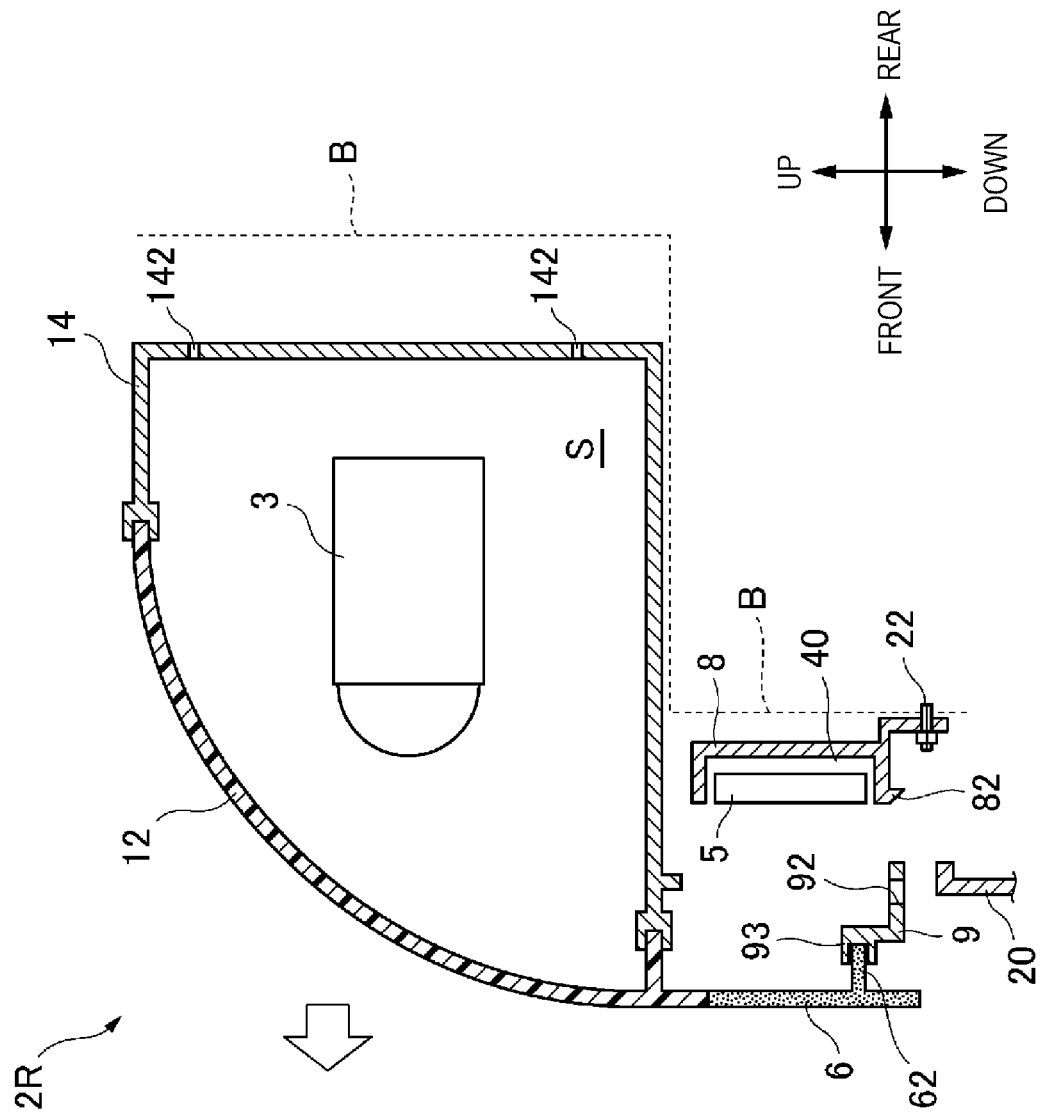
FIG. 4 is a view of the right vehicle lamp with other components than a support member and a radar detached from the vehicle.

The lamp housing 14 is provided with attachment holes 142 (see FIG. 4). The lamp housing 14 is attached to a vehicle body B with screws 23 inserted into the attachment holes 142. The lamp housing 14 may be provided with a lid part (not shown). In this case, a mechanic can take out the screws 23 from the lamp chamber S by opening the lid part (not shown).

The support member 8 is a metal bracket and is configured to support and fix the radar 5. The support member 8 is fixed to the vehicle body B with a screw 22. The support member 8 includes a lance 82 as an elastic engagement part and is configured to engage with a positioning part 9 to be described later via the lance 82 elastically.

Spacers (not shown) are provided between the radar 5 and the support member 8. Since an air layer 40 is provided between the radar 5 and the support member 8 by the spacers, external heat released from an external heat source, such as an engine, is suitably blocked by the air layer 40. In this way, it is possible to suitably prevent the radar 5 from being adversely affected by the external heat.

The support member 8 is below the lamp housing 14. Since the radar 5 and the support member 8 are outside the lamp chamber S, operation of the radar 5 is suitably prevented from being affected by heat generated from the low-beam illumination unit 3 and the high-beam illumination unit 4.

The concealing part 6 is formed integrally with the lamp cover 12 and extends downward from the lamp cover 12. The concealing part 6 and the lamp cover 12 may be integrally formed by two-tone molding using a mold. The concealing part 6 may include a protrusion 64 extending in the rear direction.

In relation to the relative position between the radar 5 and the concealing part 6, a distance d between the concealing part 6 and the radar 5 in the front-rear direction may be from 20 mm to 100 mm. If the distance d between the concealing part 6 and the radar 5 is not smaller than 20 mm, the reflected electromagnetic waves emitted from the radar 5 and reflected by the concealing part 6 are sufficiently weakened before reaching the receiving antennae of the radar 5. Therefore, it is possible to prevent the reflected electromagnetic waves received by the radar 5 from affecting radar data as noise.

On the other hand, if the distance between the concealing part 6 and the radar 5 is not greater than 100 mm, it is possible to prevent some electromagnetic waves in the field of view of the radar 5 from being unable to pass through the concealing part 6. That is, it is possible to prevent some electromagnetic waves unable to pass through the concealing part 6 from being reflected by the boundary between the concealing part 6 and the lamp cover 12 or by another optical component to have ill effects on the radar data as noise.

Figure 3:
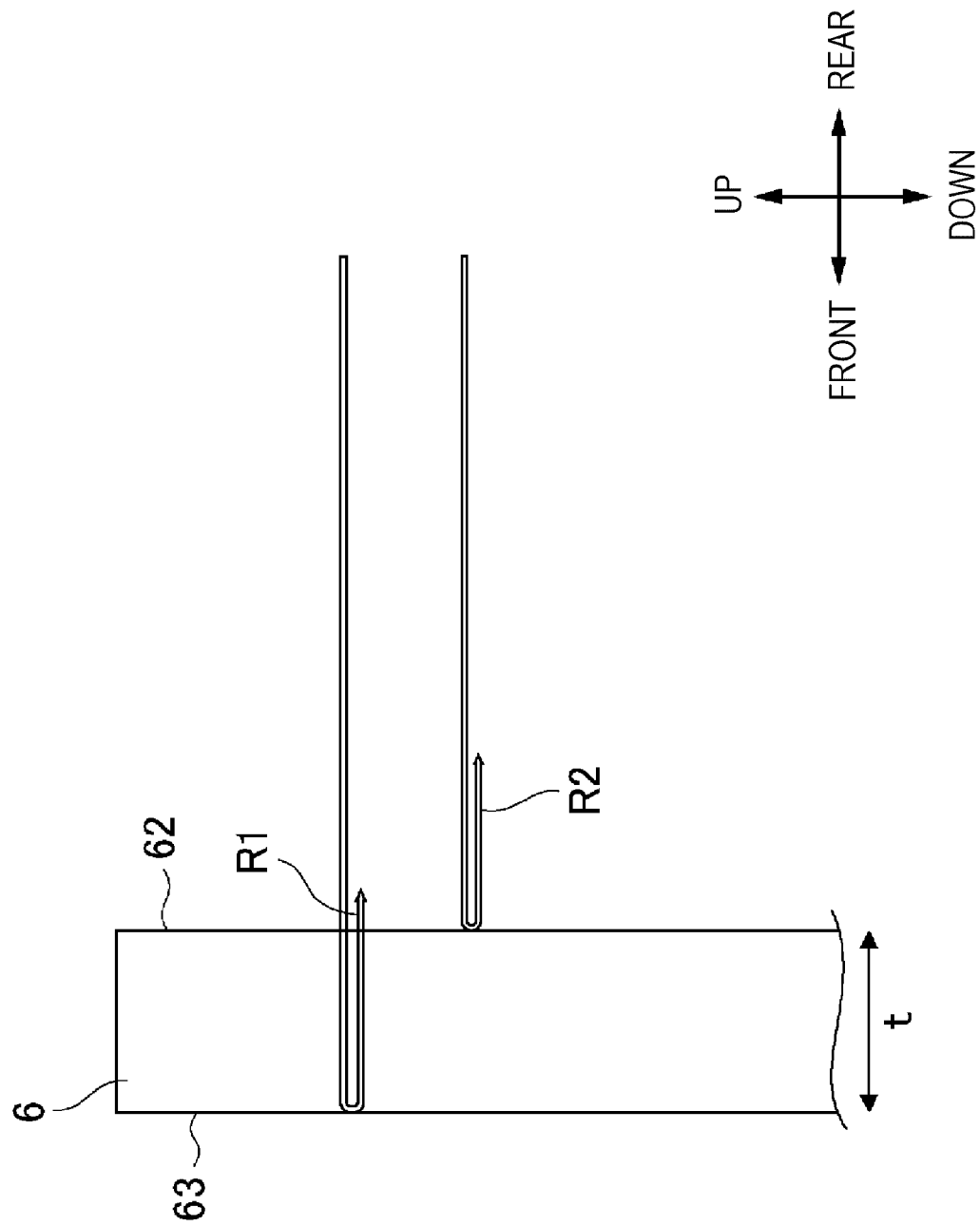
FIG. 3 is a diagram showing reflected electromagnetic waves reflected by a concealing part.

Next, a thickness t of the concealing part 6 in the front-rear direction will be described with reference to FIG. 3. FIG. 3 is a diagram showing reflected electromagnetic waves R1 and R2 reflected by the concealing part 6. The thickness t of the concealing part 6 shown in FIG. 3 follows the following equation (1);

[Equation 1]

$$t = \frac{\lambda}{2\sqrt{\varepsilon_r}} \times n, \quad (1)$$

where $\lambda$ is a wavelength of an electromagnetic wave emitted from the radar 5, $\varepsilon_r$, is relative permittivity of the concealing part 6, and n is a positive integer.

If the thickness t of the concealing part 6 follows the above equation (1), the reflected electromagnetic wave R2 reflected by one surface 62 of the concealing part 6 facing the radar 5 and the reflected electromagnetic wave R1 reflected by the other surface 63 of the concealing part 6 on a side opposite to the one surface 62 weaken each other. Specifically, since a phase difference $\Delta\theta$ between the reflected electromagnetic waves R2 and R1 is (2m+1) $\pi$ (where m is a non-negative integer), the reflected electromagnetic waves R1 and R2 weaken each other. As a result, it is possible to reduce a reflectance of the concealing part 6 to an electromagnetic wave emitted from the radar 5. Therefore, since intensity of a reflected electromagnetic wave reflected by the concealing part 6 becomes weak, it is possible to prevent a reflected electromagnetic wave received by the radar 5 from affecting radar data as noise. For example, when the wavelength $\lambda$ of the electromagnetic wave of the radar 5 is 3.922 mm, the relative permittivity $\varepsilon_r$ of the concealing part 6 is 2, and n=1, the thickness t of the concealing part 6 is 1.386 mm.

The positioning part 9 is between the concealing part 6 and the support member 8 in the front-rear direction. The positioning part 9 is fixed to the concealing part 6 and is configured to engage with the support member 8 elastically. The positioning part 9 includes: a fixing part 93 fixed to the protrusion 64 of the concealing part 6; and an engagement hole part 92 configured to engage with the lance 82 of the support member 8. When the lance 82 engages with the engagement hole part 92, the support member 8 engages with the positioning part 9 elastically. In this way, the radar 5 can be positioned to the concealing part 6 with the elastic engagement between the support member 8 and the positioning part 9.

The mechanic can release the elastic engagement between the lance 82 and the engagement hole part 92 by applying a force to the lance 82 in the up direction using a tool, such as a flathead screwdriver (see FIG. 4). Thus, the positioning part 9 can be relatively easily separated from the support member 8. In this case, the mechanic may insert the flathead screwdriver into a gap G between the concealing part 6 and a front panel 20.

According to the present embodiment, the positioning part 9 fixed to the concealing part 6 is configured to engage with the support member 8. The support member 8 is fixed to the vehicle body B with the screw 22. The concealing part 6 is integrally formed with the lamp cover 12 and is fixed to the positioning part 9.

According to the present embodiment, since the elastic engagement between the positioning part 9 and the support member 8 can be released using a tool, such as the flathead screwdriver, the positioning part 9 can be separated from the support member 8 more easily than in a case in which the support member 8 and the positioning part 9 are fixed by a screw or the like. Thus, components of the right vehicle lamp 2R other than the support member 8 and the radar 5 can be relatively easily detached from the vehicle body B with the support member 8 fixed to the vehicle body B during maintenance of the right vehicle lamp 2R. As described above, since the support member 8 is fixed to the vehicle body B, a relative position of the radar 5 to the vehicle 1 is maintained. Therefore, even when the right vehicle lamp 2R is detached from the vehicle body B during the maintenance or the like, the relative position of the radar 5 to the vehicle 1 is maintained, which obviates necessity of repositioning the radar 5 to the vehicle 1.

When components (particularly, the lamp housing 14 or the like) of the right vehicle lamp 2R detached from the vehicle body B are attached again to the vehicle body B, the concealing part 6 and the radar 5 can be easily positioned with the positioning part 9 engaging with the support member 8. In this way, it is possible to improve maintainability of the right vehicle lamp 2R including the radar 5 and the concealing part 6.

Second Embodiment

In the following, a second embodiment of the present disclosure (hereinafter, simply referred to as "the present embodiment") will be described with reference to the drawings. Dimensions of components shown in the drawings may be different from actual dimensions of the components for the sake of convenience. Detailed description of components having the same reference numerals as in the first embodiment will not be repeated.

Figure 5:
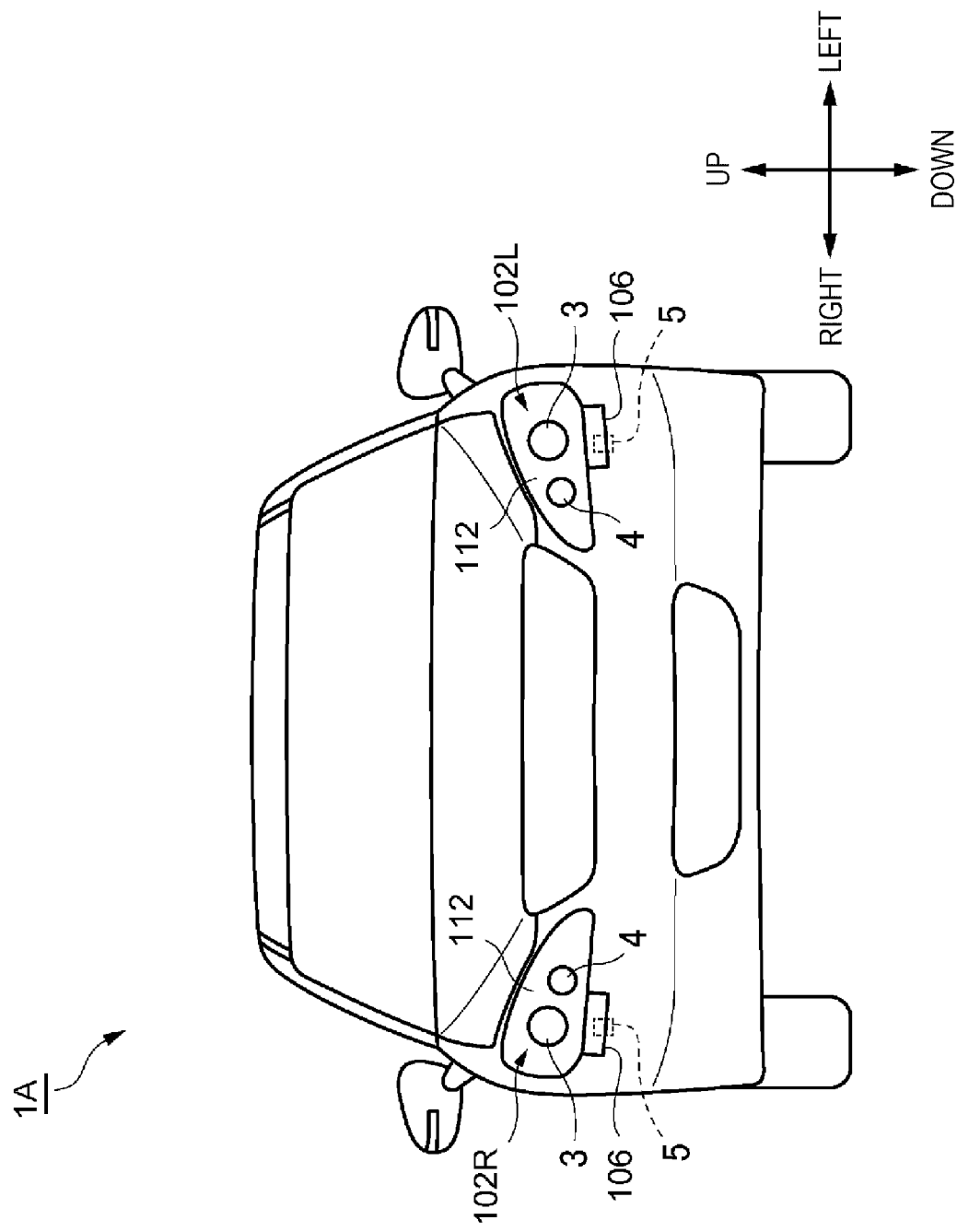
FIG. 5 is a front view of a vehicle including a left vehicle lamp and a right vehicle lamp.

First, a vehicle 1A according to the present embodiment will be described with reference to FIG. 5. FIG. 5 is a front view of the vehicle 1A including a left vehicle lamp 102L and a right vehicle lamp 102R. As shown in FIG. 5, the left vehicle lamp 102L is on the front left side of the vehicle 1A, and the right vehicle lamp 102R is on the front right side of the vehicle 1A. Each of the left vehicle lamp 102L and the right vehicle lamp 102R includes: the low-beam illumination unit 3; the high-beam illumination unit 4; the radar 5; and the concealing part 106 configured to conceal the radar 5.

In the present embodiment, the left vehicle lamp 102L is similar to the right vehicle lamp 102R. Therefore, in the following, the right vehicle lamp 102R will be described with reference to FIG. 6. For the sake of convenience, the left vehicle lamp 102L and the right vehicle lamp 102R will be generically referred to as a "vehicle lamp 102" simply.

The low-beam illumination unit 3 is configured to emit a low-beam light distribution pattern toward the front of the vehicle 1A. The high-beam illumination unit 4 is configured to emit a high-beam light distribution pattern toward the front of the vehicle 1A.

The radar 5 is configured to acquire radar data indicating surroundings of the vehicle 1A by emitting an electromagnetic wave (for example, a millimeter wave and a microwave) outside the vehicle 1A. The radar 5 is, for example, a millimeter-wave radar or a microwave radar. A vehicle control unit (in-vehicle computer, not shown) is configured to catch the surroundings of the vehicle 1A (in particular, information on an object outside the vehicle 1A) based on the radar data output from the radar 5.

The concealing part 106 faces the radar 5 to conceal the radar 5 from the outside of the vehicle 1A. The concealing part 106 is configured to let an electromagnetic wave emitted from the radar 5 through. The concealing part 106 may be configured with, for example, an opaque resin member. In particular, the concealing part 106 may be configured with a resin member colored in a predetermined color, such as black. The concealing part 106 may be configured with a reflex reflector having a large number of fine prisms. In this case, since light from the outside is totally reflected by the prisms of the reflex reflector, the radar 5 can be concealed from the outside by the reflex reflector. Therefore, the radar 5 can be concealed from the outside of the vehicle 1A by the concealing part 106, thereby improving exterior design of the right vehicle lamp 102R.

Figure 6:
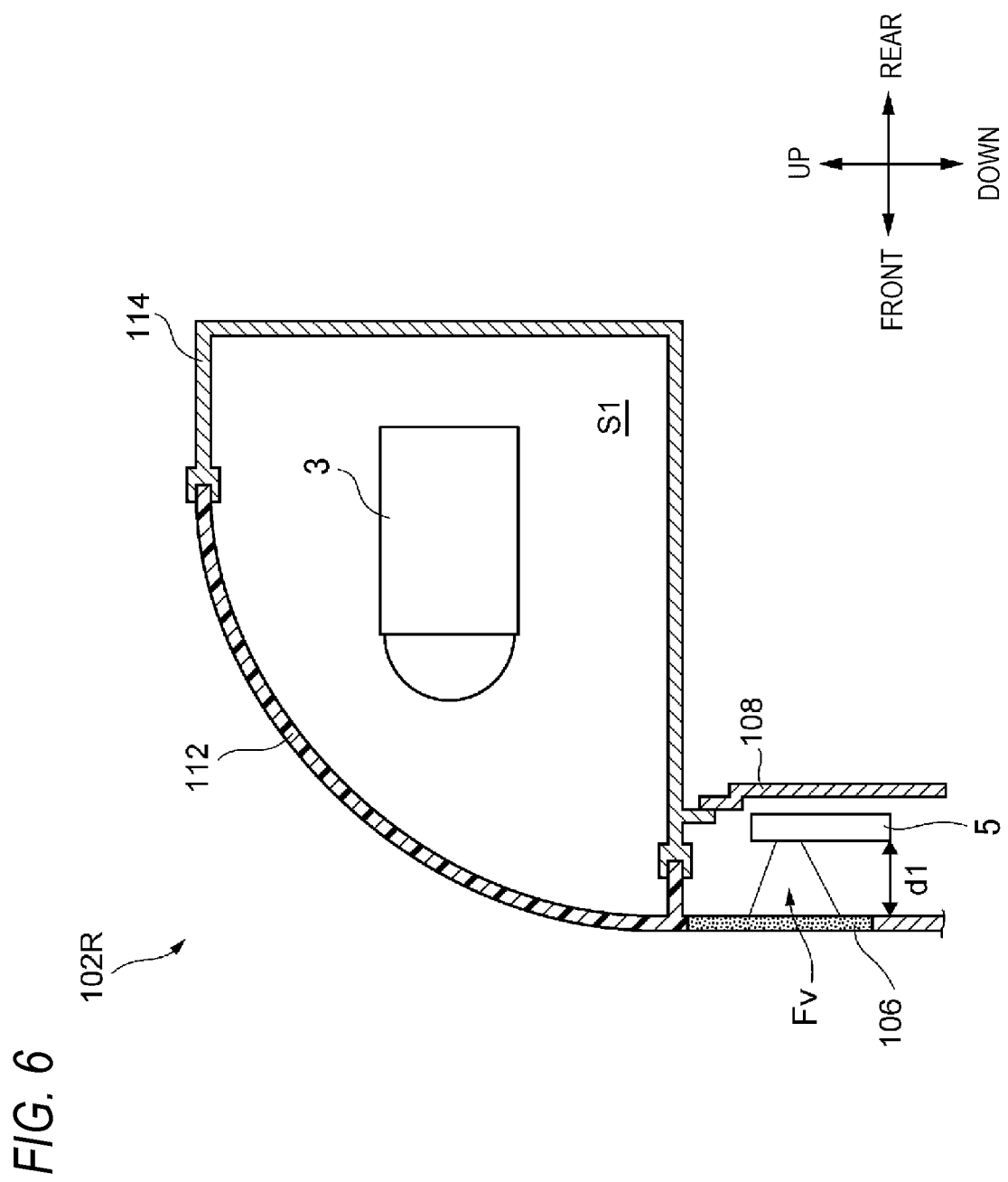
FIG. 6 is a cross sectional view of the right vehicle lamp in the vertical direction.

FIG. 6 is a cross sectional view of the right vehicle lamp 102R in the vertical direction (up-down direction). As shown in FIG. 6, the right vehicle lamp 102R further includes: a lamp housing 114; a lamp cover 112 covering an opening of the lamp housing 114; and a support member 108. The lamp housing 114 may be configured with, for example, a metal member. The lamp cover 112 may be configured with, for example, a transparent resin member. The low-beam illumination unit 3 and the high-beam illumination unit 4 are in a lamp chamber S1 formed by the lamp housing 114 and the lamp cover 112.

The support member 108 is a metal bracket and is configured to support and fix the radar 5. The support member 108 is fixed to the lamp housing 114 with screws 122 (see FIG. 8). The support member 108 extends downward from the lamp housing 114. Since the radar 5 and the support member 108 are outside the lamp chamber S1, operation of the radar 5 is suitably prevented from being affected by heat generated from the low-beam illumination unit 3 and the high-beam illumination unit 4.

The concealing part 106 is formed integrally with the lamp cover 112 and extends downward from the lamp cover 112. The concealing part 106 and the lamp cover 112 may be integrally formed by two-tone molding using a mold.

A field of view Fh (see FIG. 8) of the radar 5 in the horizontal direction may be, for example, within a range of 120° to 180°. In other words, the field of view Fh of the radar 5 may be within a range of ±60° to ±90° with respect to a center axis of the radar 5. The field of view Fv of the radar 5 in the vertical direction may be, for example, within a range of 3° to 100°. The field of view of the radar 5 is synonymous with a detection range of the radar 5.

Figure 8:
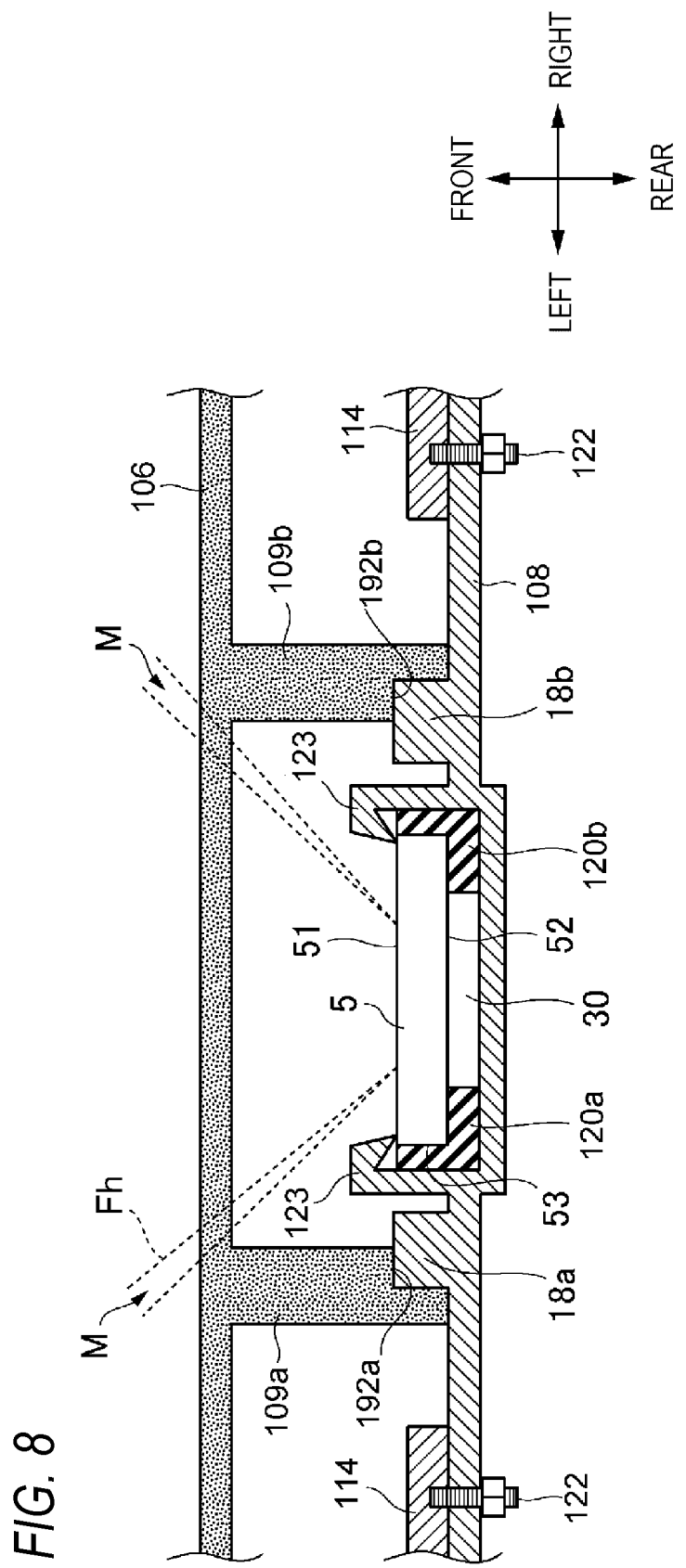
FIG. 8 is a cross sectional view showing the radar, a support member, and the concealing part in a horizontal direction.

As shown in FIG. 8, angular regions adjacent to both ends of the field of view Fh of the radar 5 are defined as margin angular region M. While intensity of electromagnetic waves in the margin angular region M is sufficiently smaller than in the field of view Fh, metal members reflecting the electromagnetic waves cannot be disposed in the margin angular region M. The margin angular region M may be, for example, within a range of 3° to 5°.

In relation to the relative position between the radar 5 and the concealing part 106, a distance d1 between the concealing part 106 and the radar 5 in the front-rear direction may be from 20 mm to 100 mm. If the distance d1 between the concealing part 106 and the radar 5 is not smaller than 20 mm, the reflected electromagnetic waves emitted from the radar 5 and reflected by the concealing part 106 are sufficiently weakened before reaching the receiving antennae of the radar 5. Therefore, it is possible to prevent the reflected electromagnetic waves received by the radar 5 from affecting radar data as noise.

On the other hand, if the distance between the concealing part 106 and the radar 5 is not greater than 100 mm, it is possible to prevent some electromagnetic waves in the field of view of the radar 5 from being unable to pass through the concealing part 106. That is, it is possible to prevent some electromagnetic waves unable to pass through the concealing part 106 from being reflected by the boundary between the concealing part 106 and the lamp cover 112 or by another optical component to have ill effects on the radar data as noise.

Figure 7:
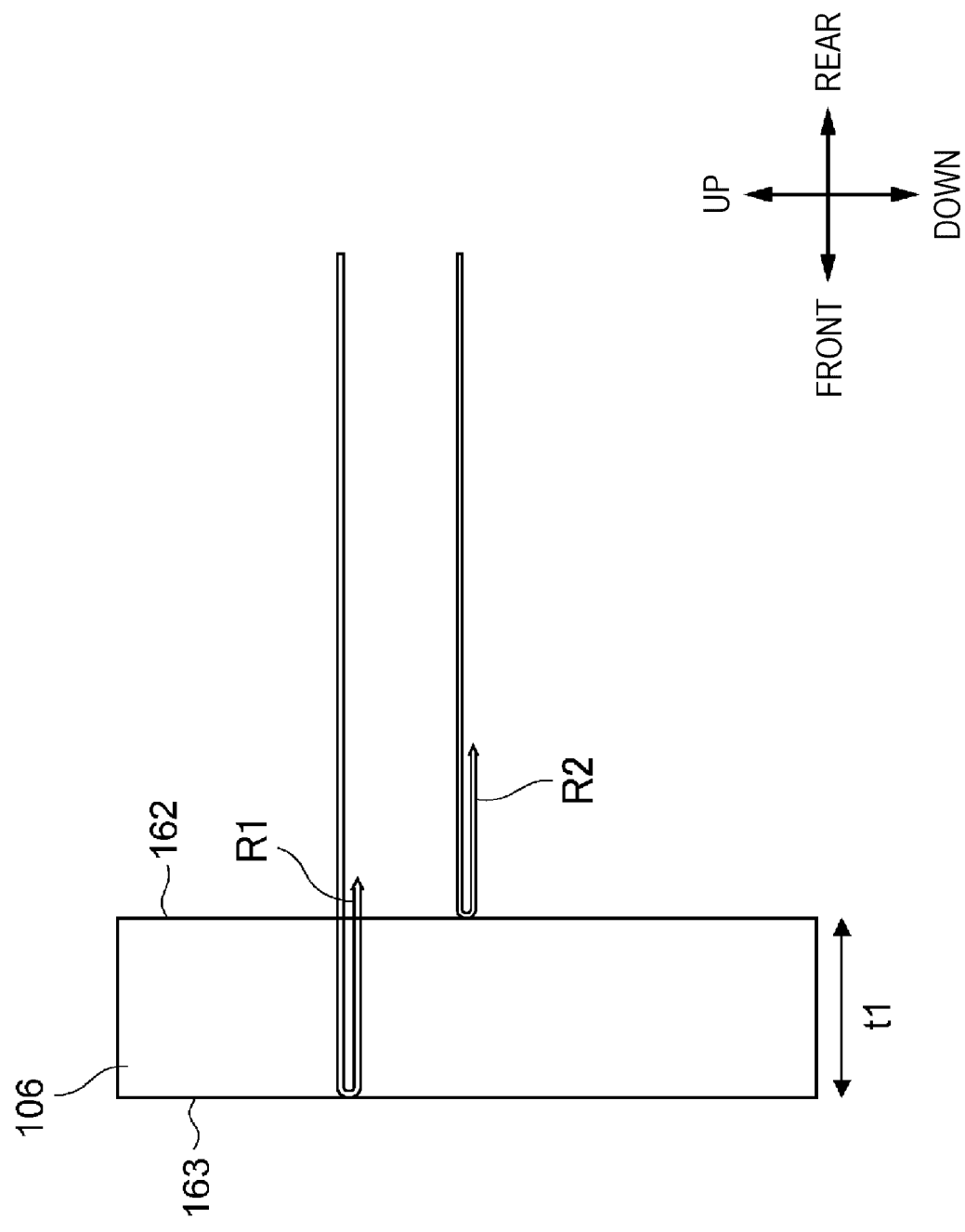
FIG. 7 is a diagram showing reflected electromagnetic waves reflected by a concealing part.

Next, a thickness $t_1$ of the concealing part 106 in the front-rear direction will be described with reference to FIG. 7. FIG. 7 is a diagram showing reflected electromagnetic waves R1 and R2 reflected by the concealing part 106. The thickness $t_1$ of the concealing part 106 shown in FIG. 7 follows the following equation (2):

[Equation 2]

$$t_1 = \frac{\pi}{2\sqrt{\varepsilon_r}} \times n, \quad (2)$$

where $\lambda$ is a wavelength of an electromagnetic wave emitted from the radar 5, $\varepsilon_r$ is relative permittivity of the concealing part 106, and n is a positive integer.

If the thickness $t_1$ of the concealing part 106 follows the above equation (2), the reflected electromagnetic wave R2 reflected by one surface 162 of the concealing part 106 facing the radar 5 and the reflected electromagnetic wave R1 reflected by the other surface 163 of the concealing part 106 on a side opposite to the one surface 162 weaken each other. Specifically, since a phase difference $\Delta\theta$ between the reflected electromagnetic waves R2 and R1 is (2m+1) $\pi$ (where m is a non-negative integer), the reflected electromagnetic waves R1 and R2 weaken each other. As a result, it is possible to reduce a reflectance of the concealing part 106 to an electromagnetic wave emitted from the radar 5. Therefore, since intensity of a reflected electromagnetic wave reflected by the concealing part 106 becomes weak, it is possible to prevent a reflected electromagnetic wave received by the radar 5 from affecting radar data as noise. For example, when the wavelength $\lambda$ of the electromagnetic wave of the radar 5 is 3.922 mm, the relative permittivity $\varepsilon_r$, of the concealing part 106 is 2, and n=1, the thickness $t_1$ of the concealing part 106 is 1.386 mm.

Next, the radar 5, the support member 108, and the concealing part 106 will be specifically described with reference to FIG. 8. FIG. 8 is a cross sectional view showing the radar 5, the support member 108, and the concealing part 106 in the horizontal direction. As shown in FIG. 8, the support member 108 is fixed to the lamp housing 114 with the screws 122 as fixing members. The radar 5 is supported and fixed by the lance 123 provided in the support member 108. The radar 5 includes: the front surface 51; the rear surface 52 on the side opposite to the front surface 51; and the side surfaces 53 between the front surface 51 and the rear surface 52. An electromagnetic wave emitted from the antenna part of the radar 5 are sent out into air via the front surface 51.

The spacers 120a and 120b are provided between the radar 5 and the support member 108. Thermal conductivity of the spacers 120a and 120b may be lower than the support member 108. The spacer 120a faces the spacer 120b in the left-right direction. Each of the spacers 120a and 120b touches the rear surface 52 and the side surface 53 of the radar 5. In this way, since the two spacers 120a and 120b separated from each other are provided between the radar 5 and the support member 108, an air layer 30 (an example of a thermal insulation layer) is formed between the rear surface 52 of the radar 5 and the support member 108. By the air layer 30 whose thermal conductivity is lower than the support member 108, heat radiated from the engine (external heat source) behind the support member 108 is less transferred to the rear surface 52 of the radar 5 via the support member 108. In this way, it is possible to suitably prevent operation performance of the radar 5 (particularly, communication circuit part) from declining due to the heat radiated from the engine. Therefore, by the air layer 30, it is possible to ensure reliability of the radar 5 to heat radiated from the outside.

As described above, the radar 5 and the concealing part 106 are separated from each other by the distance d1 (see FIG. 6) in the front-rear direction. The relative position between the radar 5 and the concealing part 106 is determined by positioning parts 109a and 109b. In particular, the positioning part 109a is configured to position the support member 108 to the concealing part 106 with a concave 192a provided in the positioning part 109a engaging with a protrusion 18a provided on the support member 108. Similarly, the positioning part 109b is configured to position the support member 108 to the concealing part 106 with a concave 192b provided in the positioning part 109b engaging with a protrusion 18b provided on the support member 108. The positioning parts 109a and 109b are formed integrally with the concealing part 106 and are between the concealing part 106 and the radar 5. The positioning part 109a faces the positioning part 109b across the radar 5 in the left-right direction.

In this way, the support member 108 is positioned to the concealing part 106 by the two positioning parts 109a and 109b. When the vehicle lamp 102 is positioned to the vehicle 1A, the radar 5 is also positioned to the vehicle 1A. Therefore, the radar 5 can be positioned to the vehicle 1A relatively easily and reliably by the positioning parts 109a and 109b.

Figure 9:
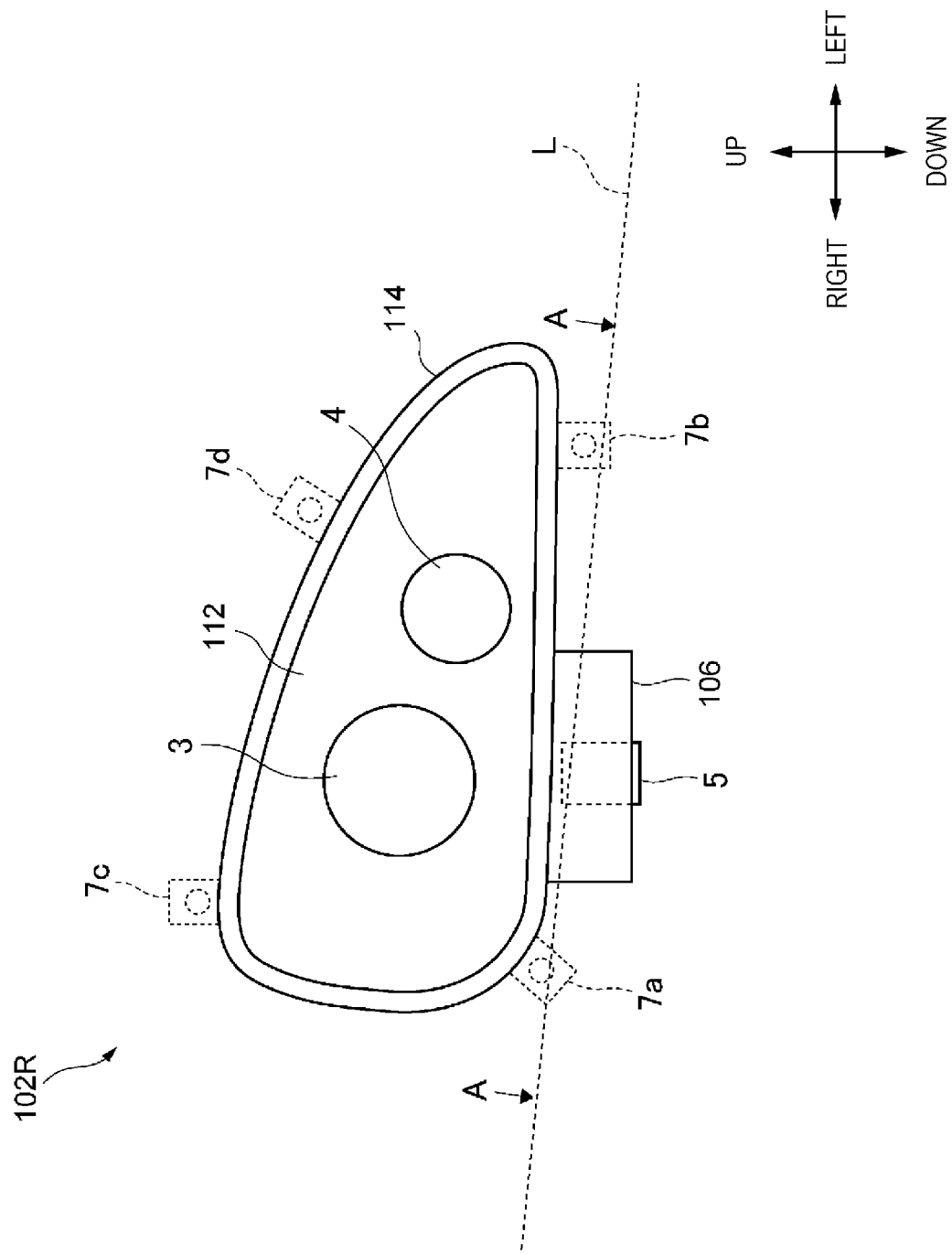
FIG. 9 is an enlarged front view of the right vehicle lamp.
Figure 10:
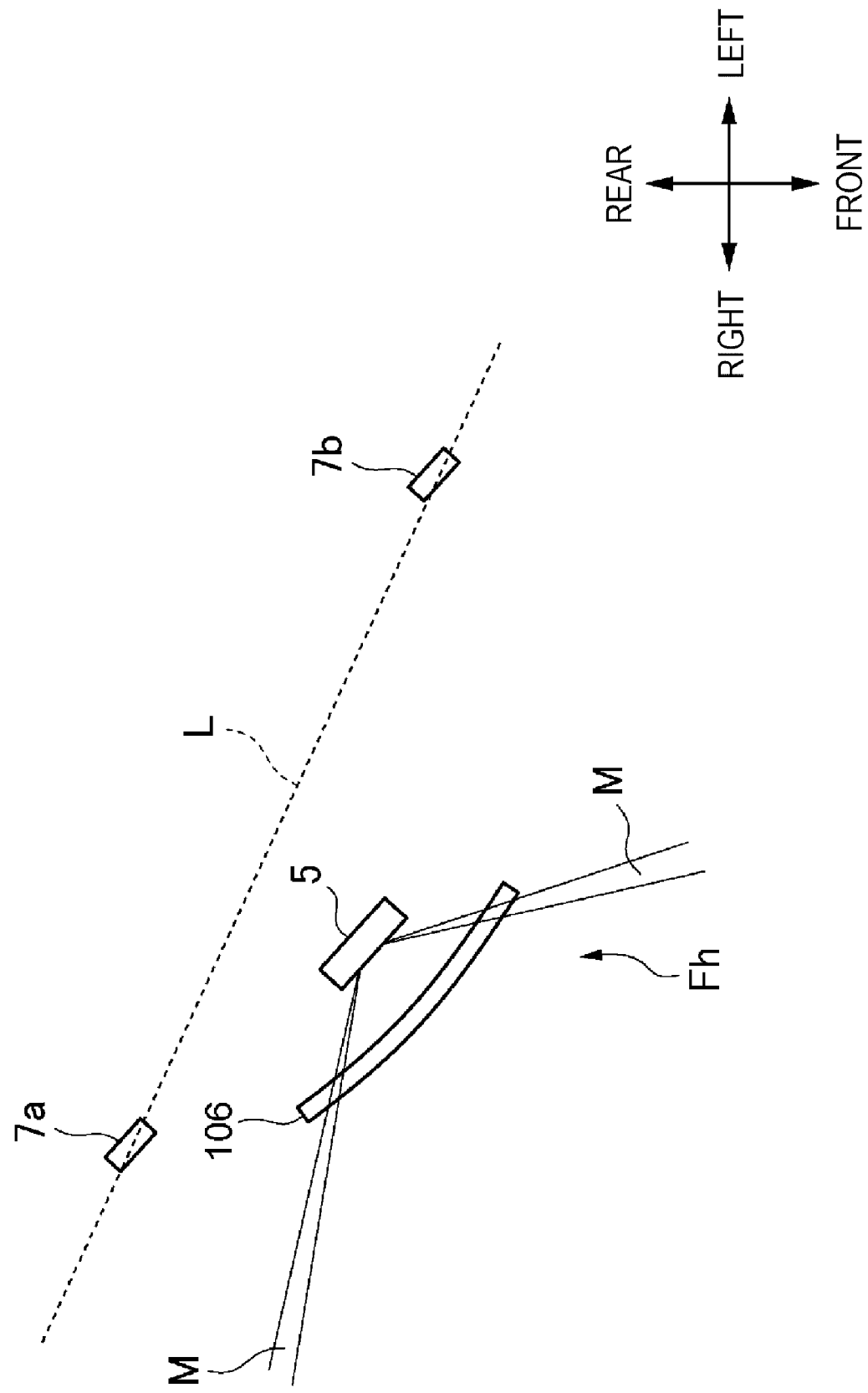
FIG. 10 is a cross sectional view showing fixing parts, the radar, and the concealing part, taken along a line A-A shown in FIG. 9.

Next, fixing parts 7a to 7d for fixing the right vehicle lamp 102R to the vehicle 1A will be described with reference to FIGS. 9 and 10. FIG. 9 is an enlarged front view of the right vehicle lamp 102R. FIG. 10 is a cross sectional view showing the fixing parts 7a and 7b, the radar 5, and the concealing part 106, taken along a line A-A shown in FIG. 9. The line A-A is parallel to an imaginary line L to be described later.

As shown in FIG. 9, the lamp housing 114 includes four fixing parts 7a to 7d for fixing the right vehicle lamp 102R to the vehicle 1A. Each of the four fixing parts 7a to 7d may include, for example, a fastening member, such as a screw, and a hole (for example, a screw hole) into which the fastening member is inserted. The right vehicle lamp 102R is fixed to a vehicle body panel of the vehicle 1A with the four fixing parts 7a to 7d.

The fixing parts 7a and 7b protrude downward from a lower end of the lamp housing 114. The fixing parts 7c and 7d protrude upward from an upper end of the lamp housing 114. The radar 5 and the concealing part 106 are between the fixing part 7a (an example of a first fixing part) and the fixing part 7b (an example of a second fixing part) in the left-right direction.

An imaginary line passing through the fixing part 7a and the fixing part 7b is defined as the imaginary line L. In this case, the fixing parts 7a and 7b are provided in the lamp housing 114 such that the concealing part 106 and the radar 5 overlap with the imaginary line L at least in part when the right vehicle lamp 102R is viewed from the front.

As described above, the radar 5 is between the fixing part 7a and the fixing part 7b in the left-right direction. Even when the lamp housing 114 shakes during traveling of the vehicle 1A, it is possible, by the fixing parts 7a and 7b, to suitably prevent the vibration of the lamp housing 114 from being transferred to the radar 5. Since operation performance of the radar 5 is suitably prevented from being adversely affected by the vibration of the radar 5, reliability of the radar 5 can be ensured.

In particular, the radar 5 overlaps with the imaginary line L at least in part when the right vehicle lamp 102R is viewed from the front. Even when the lamp housing 114 shakes during the traveling of the vehicle 1A, it is possible, by the fixing parts 7a and 7b, to suitably prevent the vibration of the lamp housing 114 from being transferred to the radar 5.

As shown in FIG. 10, the radar 5 is between the imaginary line L and the concealing part 106 in the front-rear direction or an optical-axis direction (not shown) of the radar 5. Therefore, it is possible to suitably prevent the fixing parts 7a and 7b from being in the field of view Fh and the margin regions M of the radar 5. In this way, it is possible to suitably prevent the electromagnetic waves emitted from the radar 5 and reflected by the fixing parts 7a and 7b from being received by the radar 5. Therefore, it is possible to prevent the reflected electromagnetic waves reflected by the fixing parts 7a and 7b from having ill effects on the radar data as the noise component.

Third Embodiment

In the following, a third embodiment of the present disclosure (hereinafter, simply referred to as "the present embodiment") will be described with reference to the drawings. Dimensions of components shown in the drawings may be different from actual dimensions of the components for the sake of convenience. Detailed description of components having the same reference numerals as in the first embodiment or the second embodiment will not be repeated.

Figure 11:
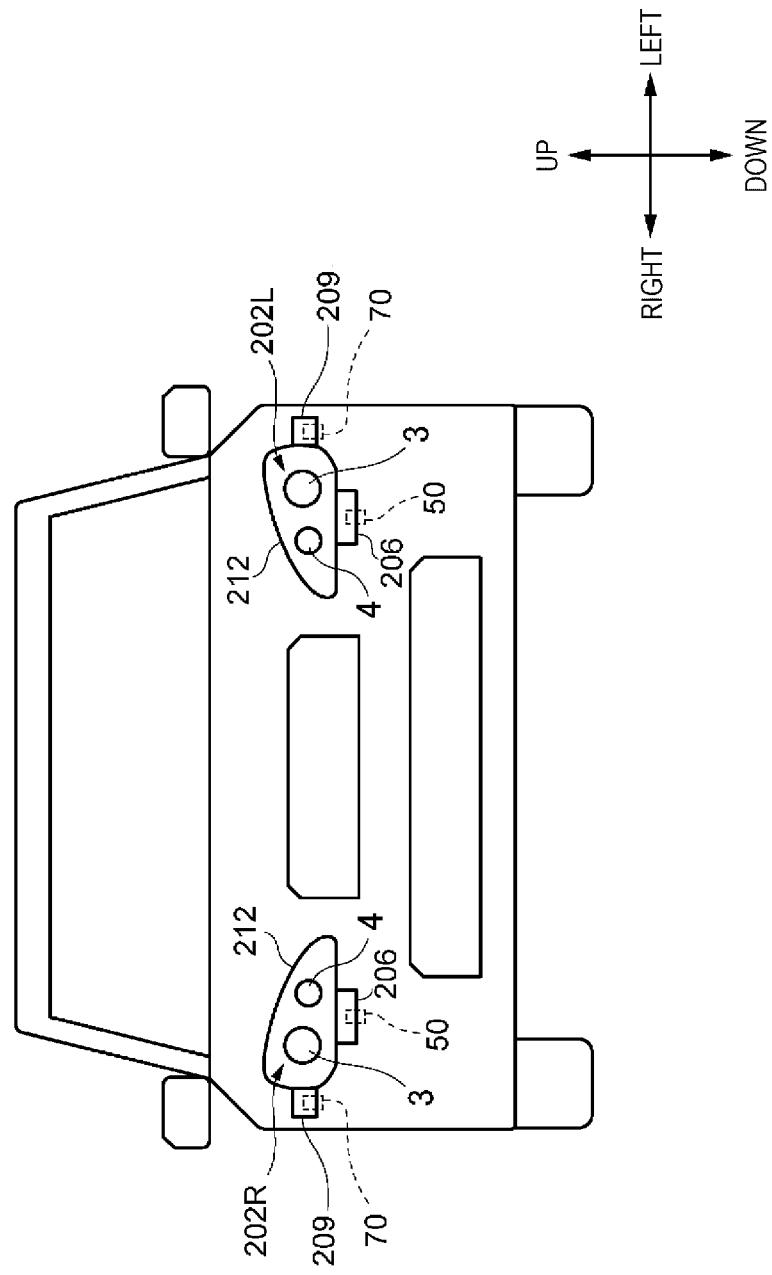
FIG. 11 is a front view of a vehicle including a left vehicle lamp and a right vehicle lamp.

First, a vehicle 1B according to the present embodiment will be described with reference to FIG. 11. FIG. 11 is a front view of the vehicle 1B including a left vehicle lamp 202L and a right vehicle lamp 202R. As shown in FIG. 11, the left vehicle lamp 202L is on the front left side of the vehicle 1, and the right vehicle lamp 202R is on the front right side of the vehicle 1B. Each of the left vehicle lamp 202L and the right vehicle lamp 202R includes: the low-beam illumination unit 3; the high-beam illumination unit 4; a first radar 50; a fist concealing part 206 configured to conceal the first radar 50; a second radar 70; and a second concealing part 209 configured to conceal the second radar 70.

In the present embodiment, the left vehicle lamp 202L is similar to the right vehicle lamp 202R. Therefore, in the following, the right vehicle lamp 202R will be described with reference to FIG. 12. For the sake of convenience, the left vehicle lamp 202L and the right vehicle lamp 202R will be generically referred to as a "vehicle lamp 202" simply.

The first radar 50 is configured to acquire radar data indicating surroundings of the vehicle 1B by emitting an electromagnetic wave (for example, a millimeter wave and a microwave) outside the vehicle 1B. The first radar 50 is, for example, a long-range millimeter-wave radar or a long-range microwave radar. The first radar 50 is closer to the center than the second radar 70 in the left-right direction (vehicle width direction) and is configured to detect an object in front of the vehicle 1B.

The first radar 50 includes an antenna part and a communication circuit part (not shown). The antenna part includes: one or more transmission antennae configured to emit an electromagnetic wave (for example, a millimeter wave having a wavelength of 1 mm to 10 mm) to the air; and one or more receiving antennae configured to receive a reflected electromagnetic wave reflected by an object. The antenna part may be configured with a patch antenna (a metal pattern formed on a substrate). An emitted electromagnetic wave emitted from the transmission antennae are reflected by an object, such as another vehicle, and then the reflected electromagnetic wave from the object is received by the receiving antennae.

The antenna part and the communication circuit part may be accommodated in a case. The antenna part may be covered with a radome.

The first concealing part 206 faces the first radar 50 to conceal the first radar 50 from the outside of the vehicle 1B. The first concealing part 206 is formed integrally with a lamp cover 212 and extends from the lamp cover 212 in the up-down direction.

The first concealing part 206 is configured to let an electromagnetic wave emitted from the first radar 50 through. The first concealing part 206 may be configured with, for example, an opaque resin member. In particular, the first concealing part 206 may be configured with a resin member colored in a predetermined color, such as black. The first concealing part 206 may be configured with a reflex reflector having a large number of fine prisms. In this case, since light from the outside is totally reflected by the prisms of the reflex reflector, the first radar 50 can be concealed from the outside by the reflex reflector. Therefore, the first radar 50 can be concealed from the outside of the vehicle 1B by the first concealing part 206, thereby improving exterior design of the right vehicle lamp 202R.

The second radar 70 is configured to acquire radar data indicating surroundings of the vehicle 1B by emitting an electromagnetic wave (for example, a millimeter wave and a microwave) outside the vehicle 1B. The second radar 70 is, for example, a short-range millimeter-wave radar or a short-range microwave radar. The second radar 70 is apart from the center in the left-right direction and is configured to detect an object diagonally forward right of the vehicle 1B.

A vehicle control unit (in-vehicle computer, not shown) is configured to catch the surroundings of the vehicle 1B (in particular, information on an object outside the vehicle 1B) based on the radar data output from the first radar 50 and the second radar 70.

A wavelength of an electromagnetic wave emitted from the second radar 70 may be the same as or different from a wavelength of an electromagnetic wave emitted from the first radar 50. The first radar 50 functions as a long-range radar while the second radar 70 functions as a short-range radar. Therefore, a detection range of the first radar 50 is longer than a detection range of the second radar 70. A field of view Fa of the first radar 50 in the horizontal direction is narrower than a field of view Fb of the second radar 70 in the horizontal direction (see FIG. 15).

The second radar 70 includes an antenna part and a communication circuit part (not shown). The antenna part includes: one or more transmission antennae configured to emit an electromagnetic wave (for example, a millimeter wave having a wavelength of 1 mm to 10 mm) to the air; and one or more receiving antennae configured to receive a reflected electromagnetic wave reflected by an object. The antenna part may be configured with a patch antenna.

The second concealing part 209 faces the second radar 70 to conceal the second radar 70 from the outside of the vehicle 1B. The second concealing part 209 is separated from the first concealing part 206, is formed integrally with a lamp cover 212, and extends from the lamp cover 212 in the left-right direction The second concealing part 209 is configured to let an electromagnetic wave emitted from the second radar 70 through. The second concealing part 209 may be configured with, for example, an opaque resin member. In particular, the second concealing part 209 may be configured with a resin member colored in a predetermined color, such as black. The concealing part 6 may be configured with a reflex reflector. Therefore, the second radar 70 can be concealed from the outside of the vehicle 1B by the second concealing part 209, thereby improving exterior design of the right vehicle lamp 202R.

Figure 12:
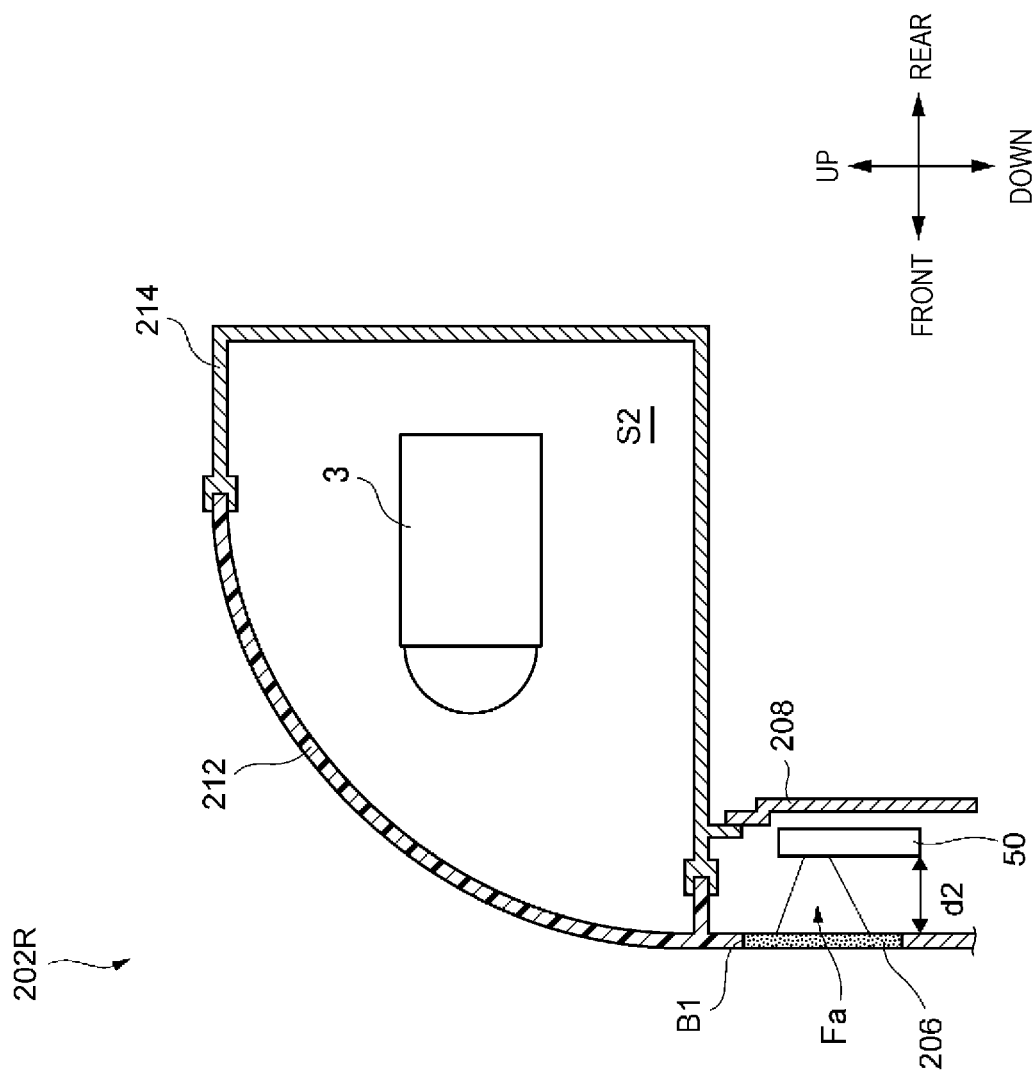
FIG. 12 is a cross sectional view of the right vehicle lamp in the vertical direction.

FIG. 12 is a cross sectional view of the right vehicle lamp 202R in the vertical direction (up-down direction). As shown in FIG. 12, the right vehicle lamp 202R further includes: a lamp housing 214; a lamp cover 212 covering an opening of the lamp housing 214; and a support member 208.

The lamp housing 214 may be configured with, for example, a metal member. The lamp cover 212 may be configured with, for example, a transparent resin member. The low-beam illumination unit 3 and the high-beam illumination unit 4 are in a lamp chamber S2 formed by the lamp housing 214 and the lamp cover 212.

The support member 208 is a metal bracket and is configured to support and fix the first radar 50. The support member 208 is fixed to the lamp housing 214 with screws 122 (see FIG. 14). The support member 208 extends downward from the lamp housing 214. Since the first radar 50 and the support member 208 are outside the lamp chamber S2, operation of the first radar 50 is suitably prevented from being affected by heat generated from the low-beam illumination unit 3 and the high-beam illumination unit 4.

The first concealing part 206 is formed integrally with the lamp cover 212 and extends downward from the lamp cover 212. The first concealing part 206 and the lamp cover 212 may be integrally formed by two-tone molding using a mold. If the first concealing part 206 and the lamp cover 212 are integrally formed by two-tone molding, a protrusion is formed on the first concealing part 206 and the lamp cover 212 around a boundary B1 between the first concealing part 206 and the lamp cover 212. Therefore, in the present embodiment, a relative position between the first concealing part 206 and the first radar 50 is adjusted such that the boundary B1 between the first concealing part 206 and the lamp cover 212 is out of a field of view Fa of the first radar 50 in the vertical direction.

In this way, since the boundary B1 between the first concealing part 206 and the lamp cover 212 is out of the field of view Fa of the first radar 50, it is possible to prevent an electromagnetic wave in the field of view Fa of the first radar 50 from being reflected by the protrusion formed on the boundary B1 to the receiving antennae of the first radar 50 to have ill effects on the radar data. Therefore, it is possible to conceal the first radar 50 from the outside of the vehicle 1B with reliability of radar data acquired by the first radar 50 mounted on the right vehicle lamp 202R ensured.

The field of view Fa (see FIG. 15) of the first radar 50 functioning as a long-range radar in the horizontal direction may be, for example, within a range of ±5° to ±10°. The field of view Fa of the first radar 50 in the vertical direction may be, for example, within a range of ±2° to ±8°. The field of view of the first radar 50 is synonymous with a detection range of the first radar 50.

The detection range of the first radar 50 functioning as a long-distance radar is, for example, 250 m. The detection range of a radar refers to an upper limit distance at which the radar can detect an object. When the object is within the detection range of the radar, the radar can detect the object.

When the object is farther than the detection range of the radar, the radar cannot detect the object.

In relation to the relative position between the first radar 50 and the first concealing part 206, a distance d2 between the first concealing part 206 and the first radar 50 in the front-rear direction may be from 20 mm to 100 mm. If the distance d2 between the first concealing part 206 and the first radar 50 is not smaller than 20 mm, the reflected electromagnetic waves emitted from the first radar 50 and reflected by the first concealing part 206 are sufficiently weakened before reaching the receiving antennae of the first radar 50. Therefore, it is possible to prevent the reflected electromagnetic waves received by the first radar 50 from affecting radar data as noise.

On the other hand, if the distance between the first concealing part 206 and the first radar 50 is not greater than 100 mm, it is possible to prevent some electromagnetic waves in the field of view of the first radar 50 from being unable to pass through the first concealing part 206. That is, it is possible to prevent some electromagnetic waves unable to pass through the first concealing part 206 from being reflected by the boundary B1 between the first concealing part 206 and the lamp cover 212 or by another optical component to have ill effects on the radar data as noise.

Figure 13:
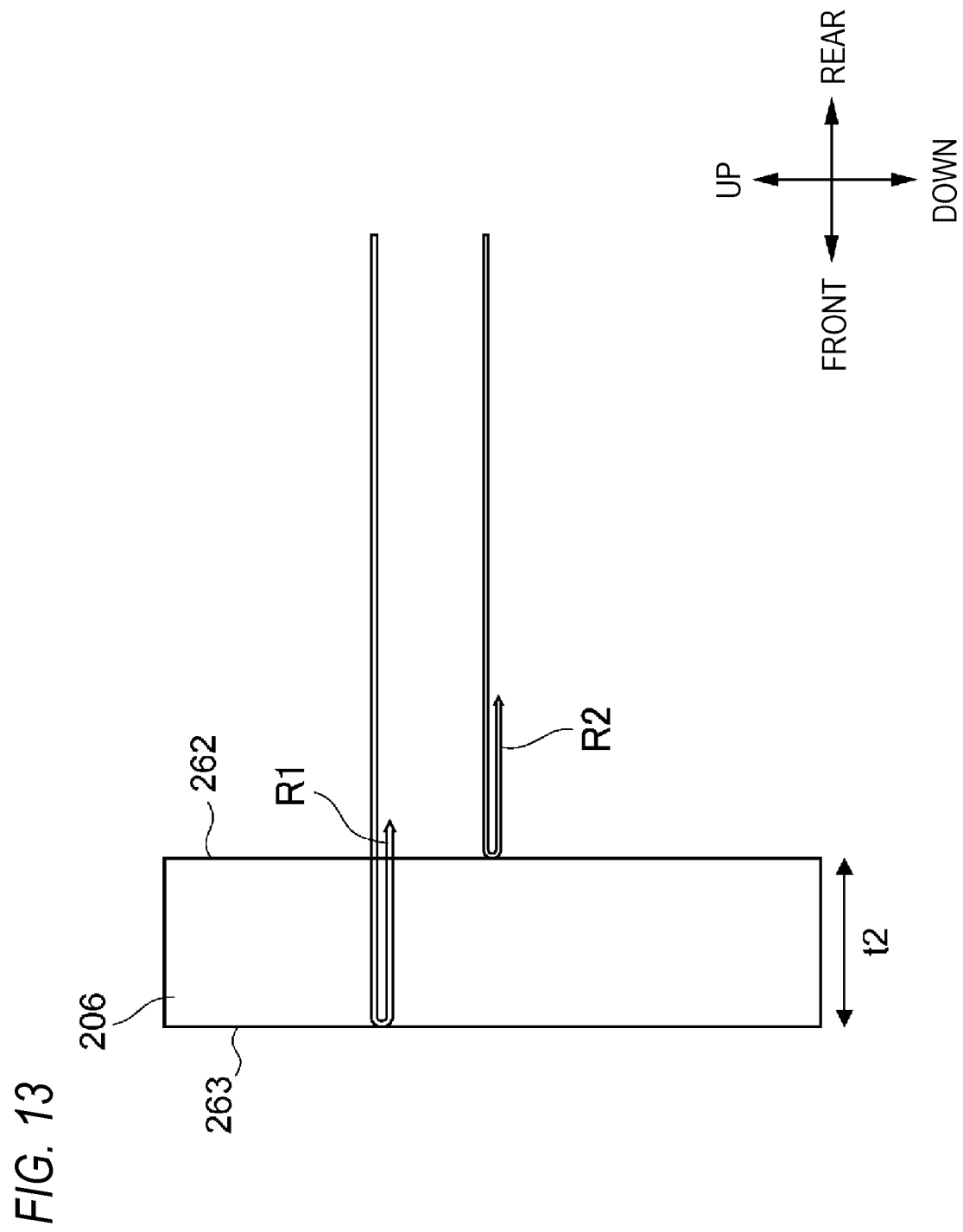
FIG. 13 is a diagram showing reflected electromagnetic waves reflected by a concealing part.

Next, a thickness $t_2$ of the first concealing part 206 in the front-rear direction will be described with reference to FIG. 13. FIG. 13 is a diagram showing reflected electromagnetic waves R1 and R2 reflected by the first concealing part 206. The thickness $t_2$ of the first concealing part 206 shown in FIG. 13 follows the following equation (3):

[Equation 3]

$$t_2 = \frac{\lambda}{2\sqrt{\varepsilon_r}} \times n, \quad (3)$$

where $\lambda$ is a wavelength of an electromagnetic wave emitted from the first radar 50, $\varepsilon_r$ is relative permittivity of the first concealing part 206, and n is a positive integer.

If the thickness $t_2$ of the first concealing part 206 follows the above equation (3), the reflected electromagnetic wave R2 reflected by one surface 262 of the first concealing part 206 facing the first radar 50 and the reflected electromagnetic wave R1 reflected by the other surface 263 of the first concealing part 206 on a side opposite to the one surface 262 weaken each other. Specifically, since a phase difference $\Delta\theta$ between the reflected electromagnetic waves R2 and R1 is (2m+1) $\pi$ (where m is a non-negative integer), the reflected electromagnetic waves R1 and R2 weaken each other. As a result, it is possible to reduce a reflectance of the first concealing part 206 to an electromagnetic wave emitted from the first radar 50. Therefore, since intensity of a reflected electromagnetic wave reflected by the first concealing part 206 becomes weak, it is possible to prevent a reflected electromagnetic wave received by the first radar 50 from affecting radar data as noise. For example, when the wavelength $\lambda$ of the electromagnetic wave of the first radar 50 is 3.922 mm, the relative permittivity $\varepsilon_r$ of the first concealing part 206 is 2, and n=1, the thickness $t_2$ of the first concealing part 206 is 1.386 mm.

Figure 14:
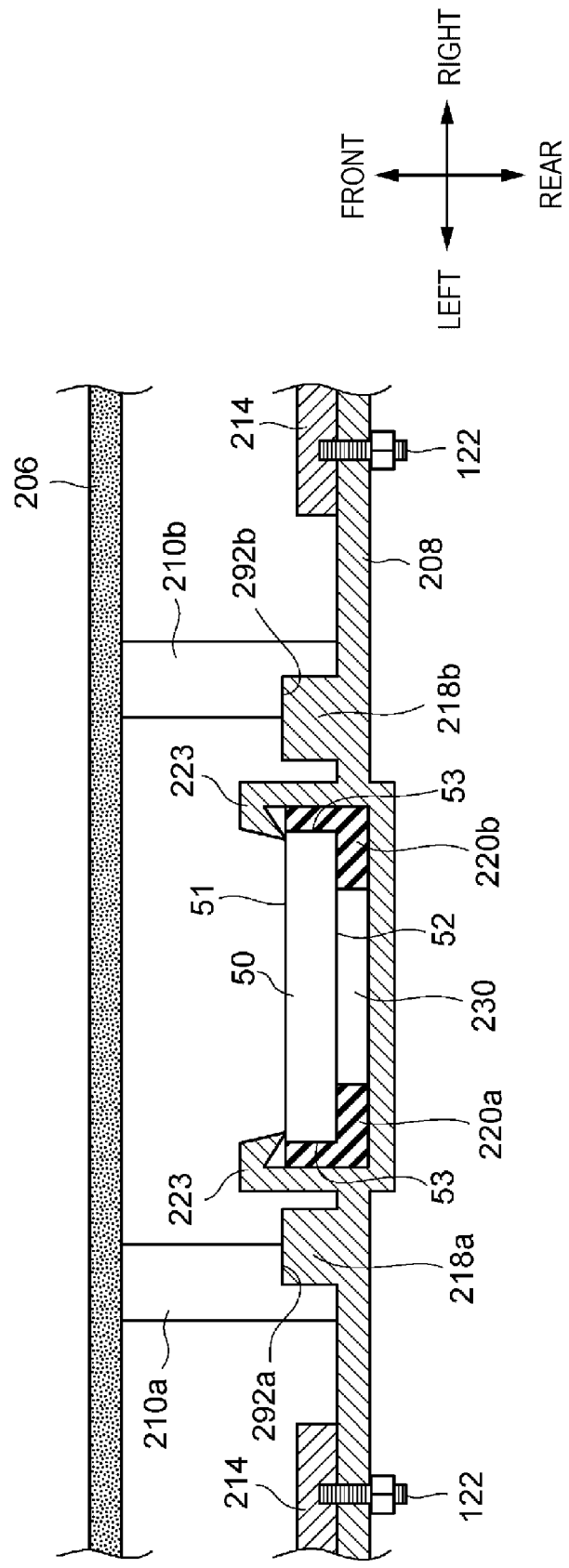
FIG. 14 is a cross sectional view showing a first radar, a support member, and a first concealing part in the horizontal direction.

Next, the first radar 50, the support member 208, and the first concealing part 206 will be specifically described with reference to FIG. 14. FIG. 14 is a cross sectional view showing the first radar 50, the support member 208, the first concealing part 206 in the horizontal direction. As shown in FIG. 14, the support member 208 is fixed to the lamp housing 214 with the screws 122 as fixing members. The first radar 50 is supported and fixed by a lance 223 provided in the support member 208. The first radar 50 includes: the front surface 51; the rear surface 52 on the side opposite to the front surface 51; and the side surfaces 53 between the front surface 51 and the rear surface 52. An electromagnetic wave emitted from the antenna part of the first radar 50 are sent out into air via the front surface 51.

Spacers 220a and 220b are provided between the first radar 50 and the support member 208. Thermal conductivity of the spacers 220a and 220b may be lower than the support member 208. The spacer 220a faces the spacer 220b in the left-right direction. Each of the spacers 220a and 220b touches the rear surface 52 and the side surface 53 of the first radar 50. In this way, since the two spacers 220a and 220b separated from each other are provided between the first radar 50 and the support member 208, an air layer 230 (an example of a thermal insulation layer) is provided between the rear surface 52 of the first radar 50 and the support member 208.

By the air layer 30 whose thermal conductivity is lower than the support member 208, heat radiated from the engine (not shown) behind the support member 208 is less transferred to the rear surface 52 of the first radar 50 via the support member 208. In this way, it is possible to suitably prevent operation performance of the first radar 50 (particularly, communication circuit part) from declining due to the heat radiated from the engine. Therefore, it is possible to ensure reliability of the first radar 50 to heat radiated from the outside.

As described above, the first radar 50 and the first concealing part 206 are separated from each other by the distance d2 (see FIG. 12) in the front-rear direction. The relative position between the first radar 50 and the first concealing part 206 is determined by positioning parts 210a and 210b. In particular, the positioning part 210a is configured to position the support member 208 to the first concealing part 206 with a concave 292a provided in the positioning part 210a engaging with a protrusion 218a provided on the support member 208. Similarly, the positioning part 210b is configured to position the support member 208 to the first concealing part 206 with a concave 292b provided in the positioning part 210b engaging with a protrusion 218b provided on the support member 208. The positioning parts 210a and 210b are formed integrally with the first concealing part 206 and are between the first concealing part 206 and the first radar 50. The positioning part 210a faces the positioning part 210b across the first radar 50 in the left-right direction.

In this way, the support member 208 is positioned to the first concealing part 206 by the two positioning parts 210a and 210b. When the vehicle lamp 202 is positioned to the vehicle 1B, the first radar 50 is also positioned to the vehicle 1B. Therefore, the first radar 50 can be positioned to the vehicle 1B relatively easily and reliably by the positioning parts 210a and 210b.

The first radar 50 and the first concealing part 206 have been described above. The second radar 70 and the second concealing part 209 are similar to the first radar 50 and the first concealing part 206. That is, the second concealing part 209 is formed integrally with the lamp cover 212 and extends in the right direction from the lamp cover 212. The second concealing part 209 and the lamp cover 212 may be integrally formed by two-tone molding using a mold.

The field of view Fb (see FIG. 15) of the second radar 70 functioning as a short-range radar in the horizontal direction may be, for example, within a range of ±50° to ±85°. The field of view Fb of the second radar 70 in the vertical direction may be, for example, within a range of ±5° to ±10°. The detection range of the second radar 70 functioning as a short-distance radar is, for example, 50 m.

In relation to the relative position between the second radar 70 and the second concealing part 209, a distance d3 between the second concealing part 209 and the second radar 70 in the front-rear direction may be from 20 mm to 100 mm. If the distance d3 between the second concealing part 209 and the second radar 70 is not smaller than 20 mm, the reflected electromagnetic waves emitted from the second radar 70 and reflected by the second concealing part 209 are sufficiently weakened before reaching the receiving antennae of the second radar 70. Therefore, it is possible to prevent the reflected electromagnetic waves received by the second radar 70 from affecting radar data as noise.

On the other hand, if the distance between the second concealing part 209 and the second radar 70 is not greater than 100 mm, it is possible to prevent some electromagnetic waves in the field of view of the second radar 70 from being unable to pass through the second concealing part 209. That is, it is possible to prevent some electromagnetic waves unable to pass through the second concealing part 209 from being reflected by the boundary between the first concealing part 206 and the lamp cover 212 or by another optical component to have ill effects on the radar data as noise.

The thickness $t_3$ of the second concealing part 209 follows the following equation (4):

[Equation 4]

$$t_3 = \frac{\lambda}{2\sqrt{\varepsilon_r}} \times n, \quad (4)$$

where $\lambda$ is a wavelength of an electromagnetic wave emitted from the second radar 70, $\varepsilon_r$ is relative permittivity of the second concealing part 209, and n is a positive integer.

If the thickness $t_3$ of the second concealing part 209 follows the above equation (4), the reflected electromagnetic wave reflected by one surface of the second concealing part 209 facing the second radar 70 and the reflected electromagnetic wave reflected by the other surface of the second concealing part 209 on a side opposite to the one surface weaken each other. As a result, it is possible to reduce a reflectance of the second concealing part 209 to an electromagnetic wave emitted from the second radar 70. Therefore, since intensity of a reflected electromagnetic wave reflected by the second concealing part 209 becomes weak, it is possible to prevent a reflected electromagnetic wave received by the second radar 70 from affecting radar data as noise.

If the wavelength of an electromagnetic wave emitted from the second radar 70 is the same as that of an electromagnetic wave emitted from the first radar 50 and the resin material of the second concealing part 209 is the same as the resin material of the first concealing part 206, the thickness $t_2$ of the first concealing part 206 and the thickness $t_3$ of the second concealing part 209 may be the same.

Similarly to FIG. 14, the second radar 70 is supported and fixed by a support member (not shown). The support member configured to support and fix the second radar 70 is fixed to the lamp housing 214 with a fixing member, such as a screw. A positioning part (not shown) for determining the relative position between the second radar 70 and the second concealing part 209 is formed integrally with the second concealing part 209 and is disposed between the second concealing part 209 and the second radar 70.

Since the second radar 70 and the support member are outside the lamp chamber S2, operation of the second radar 70 is suitably prevented from being affected by heat generated from the low-beam illumination unit 3 and the high-beam illumination unit 4.

Next, the field of view Fa of the first radar 50 mounted on the left vehicle lamp 202L, the field of view Fb of the second radar 70 mounted on the left vehicle lamp 202L, the field of view Fa of the first radar 50 mounted on the right vehicle lamp 202R, and the field of view Fb of the second radar 70 mounted on the right vehicle lamp 202R will be described with reference to FIG. 15. The fields of view Fa and Fb shown in FIG. 15 are fields of view (detection regions) of the radars in the horizontal direction.

As shown in FIG. 15, the field of view Fa of the first radar 50 is narrower than that Fb of the second radar 70, but the detection range of the first radar 50 is longer than that of the second radar 70. The two first radars 50 mounted on the left vehicle lamp 202L and the right vehicle lamp 202R can detect an object in front of the vehicle 1B. On the other hand, the second radar 70 mounted on the left vehicle lamp 202L can detect an object diagonally forward left of the vehicle 1B, and the second radar 70 mounted on the right vehicle lamp 202R can detect an object diagonally forward right of the vehicle 1B. In this way, it is possible to acquire information on surroundings of the vehicle 1B by the four radars mounted on the vehicle 1B.

According to the present embodiment, even if the first radar 50 and the second radar 70 are not disposed in parallel, the first radar 50 can be concealed from the outside of the vehicle 1B by the first concealing part 206 integrally formed with the lamp cover 212 and the second radar 70 can be concealed from the outside of the vehicle 1B by the second concealing part 209 integrally formed with the lamp cover 212. In this way, a process for attaching the two concealing parts 206 and 209 to the right vehicle lamp 202R is obviated. Therefore, the two radars 50 and 70 mounted on the right vehicle lamp 202R can be concealed from the outside of the vehicle 1B without increasing the number of processes for assembling the right vehicle lamp 202R.

Although the vehicle lamp in which two radars and two concealing parts are mounted in the present embodiment, the numbers of radars and concealing parts are not limited thereto. For example, three or more radars and three or more concealing parts may be mounted on the vehicle lamp.

Modification

Figure 16:
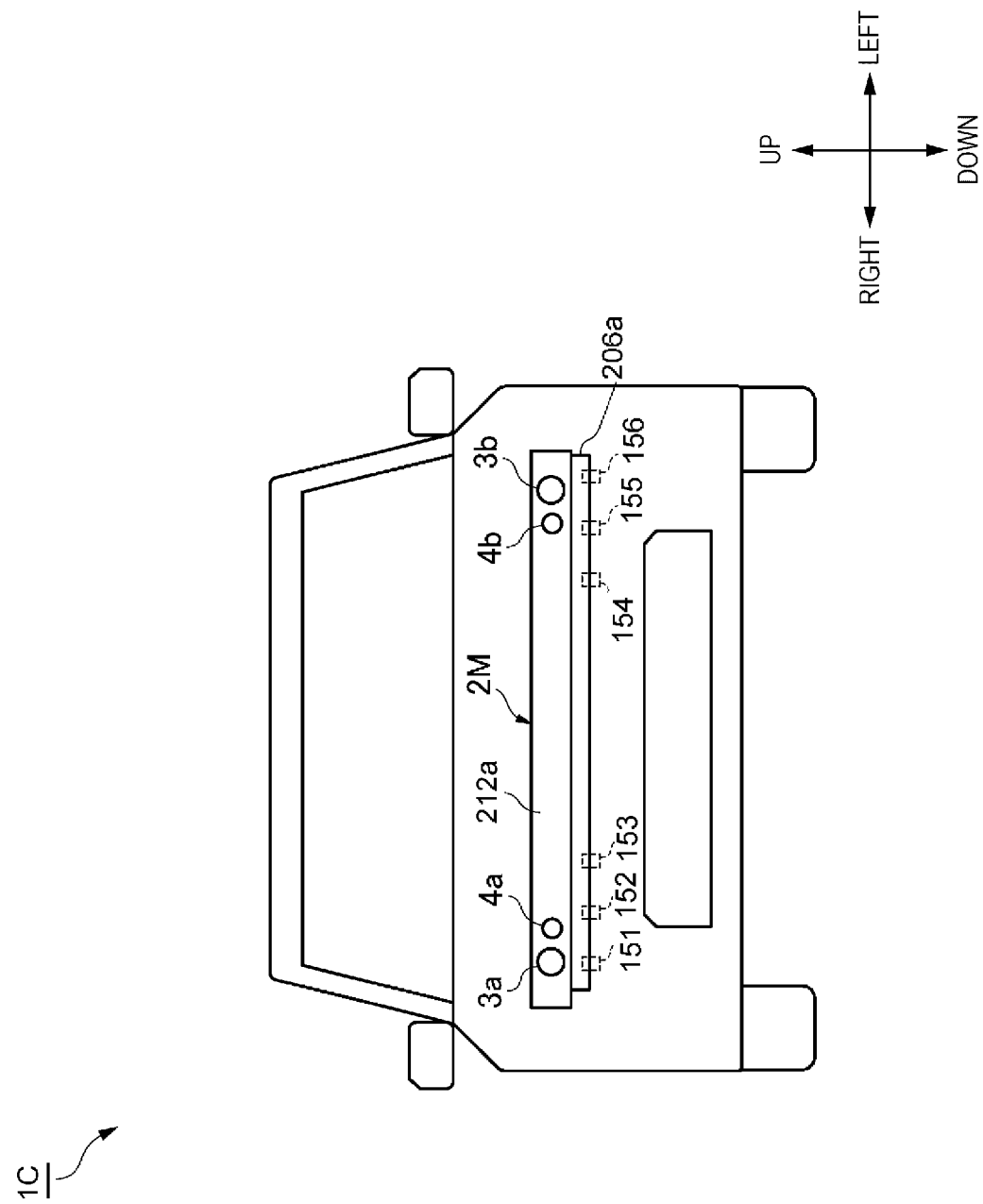
FIG. 16 is a front view of a vehicle including a vehicle lamp according to a modification.

Next, a vehicle lamp 2M according to a modification will be described with reference to FIGS. 16 and 17. FIG. 16 is a front view of a vehicle 1C including the vehicle lamp 2M according to the modification. FIG. 17 is a schematic view showing fields of view Fc to Fi of radars 151 to 156 mounted on the vehicle lamp 2M.

As shown in FIG. 16, the vehicle lamp 2M is mounted on a front side of the vehicle 1C. The vehicle lamp 2M is a vehicle lamp extending rectangularly in the left-right direction and is configured to serve both as a left vehicle lamp and a right vehicle lamp. A low-beam illumination unit 3b and a high-beam illumination unit 4b are provided on a left side of vehicle lamp 2M, and a low-beam illumination unit 3a and a high-beam illumination unit 4a are provided on a right side of vehicle lamp 2M. In particular, the two low-beam illumination units 3a and 3b and the high-beam illumination units 4a and 4b are inside a lamp chamber formed by a lamp housing (not shown) and a lamp cover 212a.

Each of the radars 151 to 156 is configured to acquire radar data indicating surroundings of the vehicle 1C by emitting electromagnetic waves (for example, millimeter waves or microwaves) to the outside of the vehicle 1C. The radars 151 to 156 are disposed in parallel in the left-right direction.

As for three radars 151 to 153 disposed on the right side of the vehicle 1C, the radar 151 is a short-range radar and is for a diagonally forward right region of the vehicle 1C. The radar 152 is an intermediate-range radar and is for a front region of the vehicle 1C. The radar 153 is a long-range radar and is for a front region of the vehicle 1C.

As for three radars 154 to 156 disposed on the left side of the vehicle 1C, the radar 156 is a short-range radar and is for a diagonally forward left region of the vehicle 1C. The radar 155 is an intermediate-range radar and is for a front region of the vehicle 1C. The radar 154 is a long-range radar and is for a front region of the vehicle 1C.

As shown in FIG. 17, the field of view Fc of the radar 151, the field of view Fd of the radar 152, and the field of view Fe of the radar 153 follow the following relation: Fc>Fd>Fe. On the other hand, a detection range Dc of the radar 151, a detection range Dd of the radar 152, and a detection range De of the radar 153 follow the following relation: De>Dd>Dc.

The field of view Fi of the radar 156, the field of view Fh of the radar 155, and the field of view Fg of the radar 154 follow the following relation: Fi>Fh>Fg. On the other hand, a detection range Di of the radar 156, a detection range Dh of the radar 155, and a detection range Dg of the radar 154 follow the following relation: Dg>Dh>Di.

The fields of view Fd and Fh of the radars 152 and 155 functioning as intermediate-range radars in the horizontal direction may be, for example, within a range of ±50° to ±85°. The fields of view Fd and Fh of the radars 152 and 155 in the vertical direction may be, for example, within a range of ±5° to ±10°. The detection ranges of the radars 152 and 155 functioning as intermediate-range radars are, for example, 100 m.

The concealing part 206a faces the radars 151 to 156 to conceal the radars 151 to 156 from the outside of the vehicle 1C. The concealing part 206a is formed integrally with the lamp cover 212a and extends downward from the lamp cover 212a. The concealing part 206a and the lamp cover 212a may be integrally formed by two-tone molding using a mold.

The concealing part 206a is configured to let an electromagnetic wave emitted from the radars 151 to 156 through. The concealing part 206a may be configured with, for example, an opaque resin member. In particular, the concealing part 206a may be configured with a resin member colored in a predetermined color, such as black. The concealing part 206a may be configured with a reflex reflector. Therefore, the radars 151 to 156 can be concealed from the outside of the vehicle 1C by the concealing part 206a, thereby improving exterior design of the vehicle lamp 2M.

In relation to the relative position between the radars 151 to 156 and the concealing part 206a, a distance d3 between the concealing part 206a and each of the radars 151 to 156 in the front-rear direction may be from 20 mm to 100 mm. If wavelengths of the electromagnetic waves emitted from the radars 151 to 156 are the same, the thickness $t_4$ of the concealing part 206a follows the following equation (5):

[Equation 5]

$$t_4 = \frac{\lambda}{2\sqrt{\varepsilon_r}} \times n, \qquad (5)$$

where $\lambda$ is a wavelength of electromagnetic waves emitted from the radars 151 to 156, $\varepsilon_r$ is relative permittivity of the concealing part 206a, and n is a positive integer.

Similarly to FIG. 14, each of the radars 151 to 156 is supported and fixed by a support member (not shown). The support member configured to support and fix the radars is fixed to the lamp housing with fixing members, such as screws.

Since the radars 151 to 156 are outside a lamp chamber, operation of the radars 151 to 156 is suitably prevented from being affected by heat generated from the low-beam illumination unit and the high-beam illumination unit.

According to the present modification, the radars 151 to 156 disposed in parallel in the left-right direction can be concealed from the outside of the vehicle 1C by the single concealing part 206 a formed integrally with the lamp cover 212a. In this way, the six radars mounted on the vehicle lamp 2M can be concealed from the outside of the vehicle 1C without increasing the number of processes for assembling the vehicle lamp 2M.

Although embodiments of the present invention have been described above, it goes without saying that the technical scope of the present invention should not be interpreted limitedly to the description of the embodiments. It is to be understood by those skilled in the art that the embodiments are mere examples and various modifications may be made within the scope of the invention described in the claims. The technical scope of the present invention should be determined based on the scope of the invention described in the claims and equivalents thereof.

The present application incorporates the contents disclosed in Japanese Patent Applications (Japanese Patent Application No. 2019-143656) filed on Aug. 5, 2019, (Japanese Patent Application No. 2019-149128) filed on Aug. 15, 2019, and (Japanese Patent Application No. 2019-149129) filed on Aug. 15, 2019, as appropriate.

The invention claimed is:

1. A vehicle lamp comprising:
a lamp housing;
a lamp cover covering an opening of the lamp housing;
an illumination unit disposed in a lamp chamber formed by the lamp housing and the lamp cover;
a radar configured to acquire radar data indicating surroundings of a vehicle by emitting an electromagnetic wave outside the vehicle;
a concealing part that faces the radar to conceal the radar from the outside of the vehicle and is configured to let the electromagnetic wave emitted from the radar through;
a support member that is fixed to a vehicle body and is configured to support and fix the radar; and
a positioning part that is disposed between the concealing part and the support member and is configured to position the radar to the concealing part, wherein
the concealing part is formed integrally with the lamp cover, the positioning part is fixed to the concealing part and is configured to engage with the support member elastically, and elastic engagement is realized in that the support member includes a lance and the positioning part includes an engagement hole part configured to engage with the lance of the support member.

2. The vehicle lamp according to claim 1, wherein the radar is outside the lamp chamber.

3. The vehicle lamp according to claim 1, wherein a distance between the concealing part and the radar is not smaller than 20 mm and not greater than 100 mm.

4. A vehicle comprising: the vehicle lamp according to claim 1.

5. A vehicle lamp comprising:
a lamp housing;
a lamp cover covering an opening of the lamp housing;
an illumination unit disposed in a lamp chamber formed by the lamp housing and the lamp cover;
a first radar configured to acquire first radar data indicating surroundings of a vehicle by emitting an electromagnetic wave outside the vehicle;
a second radar configured to acquire second radar data indicating surroundings of the vehicle by emitting an electromagnetic wave outside the vehicle; and
a concealing part configured to conceal the first radar and the second radar from the outside of the vehicle and to let the electromagnetic waves emitted from the first radar and the second radar through,
wherein the concealing part is formed integrally with the lamp cover,
wherein the first radar is closer to a center in the vehicle width direction of the vehicle than the second radar,
wherein a field of view of the first radar is narrower than a field of view of the second radar, and
wherein a detection range of the first radar is longer than a detection range of the second radar.

6. The vehicle lamp according to claim 5, wherein the concealing part includes:
a first concealing part that faces the first radar to conceal the first radar from the outside of the vehicle and is configured to let the electromagnetic wave emitted from the first radar through; and
a second concealing part that faces the second radar to conceal the second radar from the outside of the vehicle and is configured to let the electromagnetic wave emitted from the second radar through, and
the first concealing part and the second concealing part are separated from each other.

7. The vehicle lamp according to claim 6, wherein
the first concealing part is formed integrally with the lamp cover and extends from the lamp cover in a first direction, and
the second concealing part is formed integrally with the lamp cover and extends from the lamp cover in a second direction different from the first direction.

8. The vehicle lamp according to claim 5, further comprising:
a third radar configured to acquire third radar data indicating surroundings of the vehicle by emitting an electromagnetic wave outside the vehicle, wherein
the concealing part is configured to conceal the third radar from the outside of the vehicle and to let the electromagnetic wave emitted from the third radar through,
the detection range of the first radar, the detection range of the second radar, and a detection range of the third radar are different from each other, and
the field of view of the first radar, the field of view of the second radar, and a field of view of the third radar are different from each other.

* * * * *